US007817816B2

(12) United States Patent
Wang et al.

(10) Patent No.: US 7,817,816 B2
(45) Date of Patent: Oct. 19, 2010

(54) EMBEDDED INTERACTION CODE ENABLED SURFACE TYPE IDENTIFICATION

(75) Inventors: Jian Wang, Beijing (CN); Yingnong Dang, Beijing (CN); Qiang Wang, Beijing (CN); Chunhui Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 11/205,448

(22) Filed: Aug. 17, 2005

(65) Prior Publication Data

US 2007/0041654 A1 Feb. 22, 2007

(51) Int. Cl.
*G06K 9/00* (2006.01)

(52) U.S. Cl. .................. 382/100; 382/159; 382/190; 382/181; 382/206; 382/312; 382/313; 382/314; 345/156

(58) Field of Classification Search .............. 382/100, 382/103, 159, 181, 210, 314, 168–170, 206, 382/274, 312, 313, 315, 316, 276; 345/156, 345/179

See application file for complete search history.

(56) References Cited

U.S. PATENT DOCUMENTS

| 4,686,329 A | 8/1987 | Joyce |
| 4,742,558 A | 5/1988 | Ishibashi et al. |
| 4,745,269 A | 5/1988 | Van Gils et al. |
| 4,829,583 A | 5/1989 | Monroe et al. |
| 4,941,124 A | 7/1990 | Skinner, Jr. |
| 5,032,924 A | 7/1991 | Brown et al. |
| 5,051,736 A | 9/1991 | Bennett et al. |
| 5,073,966 A | 12/1991 | Sato et al. |
| 5,146,552 A | 9/1992 | Cassorla et al. |
| 5,153,928 A | 10/1992 | Iizuka |
| 5,181,257 A | 1/1993 | Steiner et al. |
| 5,196,875 A | 3/1993 | Stuckler |
| 5,235,654 A | 8/1993 | Anderson et al. |
| 5,243,149 A | 9/1993 | Comerford et al. |

(Continued)

FOREIGN PATENT DOCUMENTS

CN 1303494 7/2001

(Continued)

OTHER PUBLICATIONS

U.S. Appl. No. 10/849,249, Wang.

(Continued)

*Primary Examiner*—Vikkram Bali
*Assistant Examiner*—Julian D Brooks
(74) *Attorney, Agent, or Firm*—Perkins Coie LLP

(57) ABSTRACT

At least one image captured from a printed document and at least one image captured from a display surface other than a printed document are processed. A surface-type-identification module accepts as input both types of images and identifies, for a particular image, the type of surface from which the image was captured. A display-surface-preprocessing module preprocesses the at least one embedded-interaction-code image captured from a display surface other than a printed document. A printed-document-preprocessing module preprocesses the at least one embedded-interaction-code images captured from a printed document. An embedded-interaction-code-processing module outputs location information for at least one of the at least one image captured from a printed document and the at least one image captured from a display surface other than a printed document.

17 Claims, 30 Drawing Sheets

U.S. PATENT DOCUMENTS

| | | |
|---|---|---|
| 5,247,137 A | 9/1993 | Epperson |
| 5,253,336 A | 10/1993 | Yamada |
| 5,280,289 A | 1/1994 | Root |
| 5,288,986 A | 2/1994 | Pine et al. |
| 5,294,792 A | 3/1994 | Lewis et al. |
| 5,335,150 A | 8/1994 | Huang |
| 5,365,598 A | 11/1994 | Sklarew |
| 5,394,487 A | 2/1995 | Burger et al. |
| 5,398,082 A | 3/1995 | Henderson et al. |
| 5,414,227 A | 5/1995 | Schubert et al. |
| 5,414,538 A | 5/1995 | Eschbach |
| 5,442,147 A | 8/1995 | Burns et al. |
| 5,448,372 A | 9/1995 | Axman et al. |
| 5,450,603 A | 9/1995 | Davies |
| 5,454,054 A | 9/1995 | Iizuka |
| 5,471,533 A | 11/1995 | Wang et al. |
| 5,477,012 A | 12/1995 | Sekendur |
| 5,511,156 A | 4/1996 | Nagasaka |
| 5,546,515 A | 8/1996 | Mochizuki et al. |
| 5,581,637 A | 12/1996 | Cass et al. |
| 5,581,682 A | 12/1996 | Anderson et al. |
| 5,587,558 A | 12/1996 | Matsushima et al. |
| 5,612,524 A | 3/1997 | Sant'Anselmo et al. |
| 5,626,620 A | 5/1997 | Kieval et al. |
| 5,629,499 A | 5/1997 | Flickinger et al. |
| 5,635,697 A | 6/1997 | Shellhammer et al. |
| 5,644,652 A | 7/1997 | Bellegarda et al. |
| 5,652,412 A | 7/1997 | Lazzouni et al. |
| 5,661,291 A | 8/1997 | Ahearn et al. |
| 5,661,506 A | 8/1997 | Lazzouni et al. |
| 5,670,897 A | 9/1997 | Kean |
| 5,686,718 A | 11/1997 | Iwai et al. |
| 5,692,073 A | 11/1997 | Cass |
| 5,719,884 A | 2/1998 | Roth et al. |
| 5,721,940 A | 2/1998 | Luther et al. |
| 5,726,435 A | 3/1998 | Hara et al. |
| 5,727,098 A | 3/1998 | Jacobson |
| 5,748,808 A | 5/1998 | Taguchi et al. |
| 5,754,280 A | 5/1998 | Kato et al. |
| 5,756,981 A | 5/1998 | Roustaei et al. |
| 5,765,176 A | 6/1998 | Bloomberg |
| 5,774,602 A | 6/1998 | Taguchi et al. |
| 5,817,992 A | 10/1998 | D'Antonio |
| 5,818,436 A | 10/1998 | Imai et al. |
| 5,822,436 A | 10/1998 | Rhoads |
| 5,822,465 A | 10/1998 | Normile et al. |
| 5,825,015 A | 10/1998 | Chan et al. |
| 5,825,892 A | 10/1998 | Braudaway et al. |
| 5,850,058 A | 12/1998 | Tano et al. |
| 5,852,434 A | 12/1998 | Sekendur |
| 5,855,483 A | 1/1999 | Collins et al. |
| 5,855,594 A | 1/1999 | Olive et al. |
| 5,875,264 A | 2/1999 | Carlstrom |
| 5,890,177 A | 3/1999 | Moody et al. |
| 5,897,648 A | 4/1999 | Henderson |
| 5,898,166 A | 4/1999 | Fukuda et al. |
| 5,902,968 A | 5/1999 | Sato et al. |
| 5,937,110 A | 8/1999 | Petrie et al. |
| 5,939,703 A | 8/1999 | Hecht et al. |
| 5,960,124 A | 9/1999 | Taguchi et al. |
| 5,961,571 A | 10/1999 | Gorr et al. |
| 5,995,084 A | 11/1999 | Chan et al. |
| 6,000,614 A | 12/1999 | Yang et al. |
| 6,000,621 A | 12/1999 | Hecht et al. |
| 6,000,946 A | 12/1999 | Snyders et al. |
| 6,005,973 A | 12/1999 | Seybold et al. |
| 6,014,462 A | 1/2000 | Yamakawa |
| 6,041,335 A | 3/2000 | Merritt et al. |
| 6,044,165 A | 3/2000 | Perona et al. |
| 6,044,301 A | 3/2000 | Hartlaub et al. |
| 6,052,481 A | 4/2000 | Grajski et al. |
| 6,054,990 A | 4/2000 | Tran |
| 6,076,734 A | 6/2000 | Dougherty et al. |
| 6,081,261 A | 6/2000 | Wolff et al. |
| 6,108,453 A | 8/2000 | Acharya |
| 6,141,014 A | 10/2000 | Endo et al. |
| 6,151,424 A | 11/2000 | Hsu |
| 6,157,935 A | 12/2000 | Tran et al. |
| 6,173,084 B1 | 1/2001 | Aach et al. |
| 6,181,329 B1 | 1/2001 | Stork et al. |
| 6,186,405 B1 | 2/2001 | Yoshioka |
| 6,188,392 B1 | 2/2001 | O'Connor et al. |
| 6,192,380 B1 | 2/2001 | Light et al. |
| 6,202,060 B1 | 3/2001 | Tran |
| 6,208,771 B1 | 3/2001 | Jared et al. |
| 6,208,894 B1 | 3/2001 | Schulman et al. |
| 6,219,149 B1 | 4/2001 | Kawata et al. |
| 6,226,636 B1 | 5/2001 | Abdel-Mottaleb et al. |
| 6,230,304 B1 | 5/2001 | Groeneveld et al. |
| 6,243,071 B1 | 6/2001 | Shwarts et al. |
| 6,249,614 B1 | 6/2001 | Kolesnik et al. |
| 6,254,253 B1 | 7/2001 | Daum et al. |
| 6,256,398 B1 | 7/2001 | Chang |
| 6,259,827 B1 | 7/2001 | Nichani |
| 6,278,968 B1 | 8/2001 | Franz et al. |
| 6,294,775 B1 | 9/2001 | Seibel et al. |
| 6,310,988 B1 | 10/2001 | Flores et al. |
| 6,327,395 B1 | 12/2001 | Hecht et al. |
| 6,330,976 B1 | 12/2001 | Dymetman et al. |
| 6,335,727 B1 | 1/2002 | Morishita et al. |
| 6,340,119 B2 | 1/2002 | He et al. |
| 6,396,598 B1 | 5/2002 | Kashiwagi et al. |
| 6,408,330 B1 | 6/2002 | DeLaHuerga |
| 6,441,920 B1 | 8/2002 | Smith |
| 6,479,768 B1 | 11/2002 | How |
| 6,492,981 B1 | 12/2002 | Stork et al. |
| 6,517,266 B2 | 2/2003 | Saund |
| 6,522,928 B2 | 2/2003 | Whitehurst et al. |
| 6,529,638 B1 | 3/2003 | Westerman |
| 6,532,152 B1 | 3/2003 | White et al. |
| 6,538,187 B2 | 3/2003 | Beigi |
| 6,546,136 B1 | 4/2003 | Hull |
| 6,551,357 B1 | 4/2003 | Madduri |
| 6,558,006 B2 * | 5/2003 | Ioka ............................ 353/94 |
| 6,560,741 B1 | 5/2003 | Gerety et al. |
| 6,570,104 B1 | 5/2003 | Ericson et al. |
| 6,570,997 B2 | 5/2003 | Noguchi |
| 6,573,887 B1 | 6/2003 | O'Donnell, Jr. |
| 6,577,299 B1 | 6/2003 | Schiller et al. |
| 6,580,424 B1 | 6/2003 | Krumm |
| 6,584,052 B1 | 6/2003 | Phillips et al. |
| 6,585,154 B1 | 7/2003 | Ostrover et al. |
| 6,592,039 B1 | 7/2003 | Smith et al. |
| 6,603,464 B1 | 8/2003 | Rabin |
| 6,625,313 B1 | 9/2003 | Morita et al. |
| 6,628,267 B2 | 9/2003 | Karidis et al. |
| 6,650,320 B1 | 11/2003 | Zimmerman |
| 6,651,894 B2 | 11/2003 | Nimura et al. |
| 6,655,597 B1 | 12/2003 | Swartz et al. |
| 6,661,920 B1 | 12/2003 | Skinner |
| 6,663,008 B1 | 12/2003 | Pettersson et al. |
| 6,671,386 B1 | 12/2003 | Shimizu et al. |
| 6,674,427 B1 | 1/2004 | Pettersson et al. |
| 6,681,045 B1 | 1/2004 | Lapstun et al. |
| 6,686,910 B2 | 2/2004 | O'Donnell, Jr. |
| 6,689,966 B2 | 2/2004 | Wiebe |
| 6,693,615 B2 | 2/2004 | Hill et al. |
| 6,697,056 B1 | 2/2004 | Bergelson et al. |
| 6,728,000 B1 | 4/2004 | Lapstun et al. |
| 6,729,543 B1 | 5/2004 | Arons et al. |
| 6,731,271 B1 | 5/2004 | Tanaka et al. |
| 6,732,927 B2 | 5/2004 | Olsson et al. |
| 6,738,053 B1 | 5/2004 | Borgstrom et al. |
| 6,744,967 B2 | 6/2004 | Kaminski et al. |

| Patent | Type | Date | Inventor(s) | | Patent | Type | Date | Inventor(s) | |
|---|---|---|---|---|---|---|---|---|---|
| 6,752,317 | B2 | 6/2004 | Dymetman et al. | | 7,403,658 | B2 | 7/2008 | Lin et al. | |
| 6,760,009 | B2 | 7/2004 | Omura et al. | | 7,421,439 | B2 | 9/2008 | Wang et al. | |
| 6,783,069 | B1 | 8/2004 | Hecht et al. | | 7,430,497 | B2 | 9/2008 | Wang et al. | |
| 6,819,776 | B2 | 11/2004 | Chang | | 7,440,134 | B2 | 10/2008 | Natori | |
| 6,831,273 | B2 | 12/2004 | Jenkins et al. | | 7,440,583 | B2 | 10/2008 | Tohne et al. | |
| 6,832,724 | B2 | 12/2004 | Yavid et al. | | 7,463,784 | B2 * | 12/2008 | Kugo | 382/263 |
| 6,834,081 | B2 | 12/2004 | Kim et al. | | 7,477,784 | B2 | 1/2009 | Wang et al. | |
| 6,834,195 | B2 | 12/2004 | Brandenberg et al. | | 7,486,822 | B2 | 2/2009 | Wang et al. | |
| 6,834,337 | B1 | 12/2004 | Brady et al. | | 7,486,823 | B2 | 2/2009 | Wang et al. | |
| 6,847,356 | B1 | 1/2005 | Hasegawa et al. | | 7,502,508 | B2 | 3/2009 | Wang et al. | |
| 6,856,712 | B2 | 2/2005 | Fauver et al. | | 7,505,982 | B2 | 3/2009 | Wang et al. | |
| 6,862,371 | B2 | 3/2005 | Mukherjee | | 7,528,848 | B2 * | 5/2009 | Xu et al. | 345/626 |
| 6,864,880 | B2 | 3/2005 | Hugosson et al. | | 7,532,366 | B1 | 5/2009 | Yang et al. | |
| 6,865,325 | B2 | 3/2005 | Ide et al. | | 7,536,051 | B2 | 5/2009 | Lin et al. | |
| 6,870,966 | B1 | 3/2005 | Silverbrook et al. | | 7,542,976 | B2 | 6/2009 | Wang et al. | |
| 6,874,420 | B2 | 4/2005 | Lewis, Jr. et al. | | 7,546,524 | B1 | 6/2009 | Bryar et al. | |
| 6,879,731 | B2 | 4/2005 | Kang et al. | | 7,570,813 | B2 | 8/2009 | Wang et al. | |
| 6,880,124 | B1 | 4/2005 | Moore | | 7,580,576 | B2 * | 8/2009 | Wang et al. | 382/188 |
| 6,880,755 | B2 | 4/2005 | Gorbet et al. | | 7,583,842 | B2 | 9/2009 | Lin et al. | |
| 6,897,854 | B2 | 5/2005 | Cho et al. | | 7,599,560 | B2 | 10/2009 | Wang et al. | |
| 6,898,297 | B2 | 5/2005 | Katsura et al. | | 7,607,076 | B2 | 10/2009 | Wang et al. | |
| 6,919,892 | B1 | 7/2005 | Cheiky et al. | | 7,619,607 | B2 | 11/2009 | Zhang et al. | |
| 6,929,183 | B2 | 8/2005 | Pettersson et al. | | 7,622,182 | B2 | 11/2009 | Wang et al. | |
| 6,933,933 | B2 | 8/2005 | Fleming | | 7,639,885 | B2 | 12/2009 | Wang et al. | |
| 6,935,562 | B2 | 8/2005 | Hecht et al. | | 2001/0024193 | A1 | 9/2001 | Fahraeus | |
| 6,938,222 | B2 | 8/2005 | Hullender et al. | | 2001/0038383 | A1 | 11/2001 | Ericson et al. | |
| 6,956,968 | B1 | 10/2005 | O'Dell et al. | | 2001/0053238 | A1 | 12/2001 | Katsura et al. | |
| 6,960,777 | B2 * | 11/2005 | Soar | 250/559.11 | 2002/0028018 | A1 | 3/2002 | Hawkins et al. | |
| 6,964,483 | B2 | 11/2005 | Wang et al. | | 2002/0031622 | A1 | 3/2002 | Ippel et al. | |
| 6,968,083 | B2 | 11/2005 | Williams et al. | | 2002/0048404 | A1 | 4/2002 | Fahraeus et al. | |
| 6,970,183 | B1 | 11/2005 | Monroe | | 2002/0050982 | A1 | 5/2002 | Ericson | |
| 6,975,334 | B1 | 12/2005 | Barrus | | 2002/0069220 | A1 | 6/2002 | Tran | |
| 6,976,220 | B1 | 12/2005 | Lapstun et al. | | 2002/0163511 | A1 | 11/2002 | Sekendur | |
| 6,987,534 | B1 | 1/2006 | Seta | | 2002/0179717 | A1 | 12/2002 | Cummings et al. | |
| 6,992,655 | B2 | 1/2006 | Ericson et al. | | 2003/0001020 | A1 | 1/2003 | Kardach | |
| 6,993,185 | B2 | 1/2006 | Guo et al. | | 2003/0009725 | A1 | 1/2003 | Reichenbach | |
| 6,999,622 | B2 | 2/2006 | Komatsu | | 2003/0030638 | A1 | 2/2003 | Astrom et al. | |
| 7,003,150 | B2 | 2/2006 | Trajkovi | | 2003/0034961 | A1 | 2/2003 | Kao | |
| 7,009,594 | B2 | 3/2006 | Wang et al. | | 2003/0050803 | A1 | 3/2003 | Marchosky | |
| 7,012,621 | B2 | 3/2006 | Crosby et al. | | 2003/0081000 | A1 | 5/2003 | Watanabe et al. | |
| 7,024,429 | B2 | 4/2006 | Ngo et al. | | 2003/0088781 | A1 | 5/2003 | ShamRao | |
| 7,036,938 | B2 | 5/2006 | Wang et al. | | 2003/0090475 | A1 | 5/2003 | Paul et al. | |
| 7,048,198 | B2 | 5/2006 | Ladas et al. | | 2003/0117378 | A1 | 6/2003 | Carro | |
| 7,082,562 | B2 | 7/2006 | Lapstun et al. | | 2003/0118233 | A1 | 6/2003 | Olsson | |
| 7,092,122 | B2 | 8/2006 | Iwaki et al. | | 2003/0122855 | A1 * | 7/2003 | Pattersson | 345/690 |
| 7,110,604 | B2 | 9/2006 | Olsson et al. | | 2003/0128194 | A1 | 7/2003 | Pettersson | |
| 7,111,230 | B2 | 9/2006 | Euchner et al. | | 2003/0146883 | A1 | 8/2003 | Zelitt | |
| 7,116,840 | B2 | 10/2006 | Wang et al. | | 2003/0159044 | A1 | 8/2003 | Doyle et al. | |
| 7,119,816 | B2 | 10/2006 | Zhang et al. | | 2003/0179906 | A1 | 9/2003 | Baker et al. | |
| 7,120,853 | B2 | 10/2006 | Lapstun et al. | | 2003/0189731 | A1 | 10/2003 | Chang | |
| 7,123,742 | B2 | 10/2006 | Chang | | 2003/0214553 | A1 | 11/2003 | Dodge | |
| 7,133,031 | B2 | 11/2006 | Wang et al. | | 2003/0214669 | A1 | 11/2003 | Saitoh | |
| 7,133,563 | B2 | 11/2006 | Wang et al. | | 2004/0032393 | A1 | 2/2004 | Brandenberg et al. | |
| 7,136,054 | B2 | 11/2006 | Wang et al. | | 2004/0046744 | A1 | 3/2004 | Rafii et al. | |
| 7,139,740 | B2 | 11/2006 | Ayala | | 2004/0085286 | A1 * | 5/2004 | Wang et al. | 345/156 |
| 7,142,197 | B2 | 11/2006 | Wang et al. | | 2004/0085287 | A1 | 5/2004 | Wang | |
| 7,142,257 | B2 | 11/2006 | Callison et al. | | 2004/0085302 | A1 | 5/2004 | Wang et al. | |
| 7,145,556 | B2 | 12/2006 | Pettersson | | 2004/0086181 | A1 * | 5/2004 | Wang et al. | 382/182 |
| 7,167,164 | B2 | 1/2007 | Ericson et al. | | 2004/0086191 | A1 | 5/2004 | Wang | |
| 7,176,906 | B2 | 2/2007 | Williams et al. | | 2004/0090429 | A1 | 5/2004 | Geaghan et al. | |
| 7,190,843 | B2 | 3/2007 | Wei et al. | | 2004/0128264 | A1 | 7/2004 | Leung et al. | |
| 7,222,799 | B2 | 5/2007 | Silverbrook | | 2004/0128511 | A1 | 7/2004 | Sun et al. | |
| 7,225,979 | B2 | 6/2007 | Silverbrook et al. | | 2004/0136083 | A1 | 7/2004 | Wang | |
| 7,262,764 | B2 | 8/2007 | Wang et al. | | 2004/0153649 | A1 | 8/2004 | Rhoads et al. | |
| 7,263,224 | B2 | 8/2007 | Wang et al. | | 2004/0212553 | A1 | 10/2004 | Wang et al. | |
| 7,289,103 | B2 | 10/2007 | Lapstun et al. | | 2004/0233163 | A1 | 11/2004 | Lapstun et al. | |
| 7,292,370 | B2 | 11/2007 | Iwaki et al. | | 2005/0024324 | A1 | 2/2005 | Tomasi et al. | |
| 7,293,240 | B2 | 11/2007 | Lapstun et al. | | 2005/0044164 | A1 | 2/2005 | O'Farrell et al. | |
| 7,295,193 | B2 | 11/2007 | Fahraeus | | 2005/0052700 | A1 | 3/2005 | Mackenzie et al. | |
| 7,330,605 | B2 | 2/2008 | Wang et al. | | 2005/0104909 | A1 | 5/2005 | Okamura et al. | |
| 7,359,094 | B1 | 4/2008 | Sayuda | | 2005/0106365 | A1 | 5/2005 | Palmer et al. | |
| 7,386,191 | B2 | 6/2008 | Wang et al. | | 2005/0138541 | A1 | 6/2005 | Euchner et al. | |
| 7,400,777 | B2 | 7/2008 | Wang et al. | | 2005/0146518 | A1 | 7/2005 | Wang et al. | |

| | | | |
|---|---|---|---|
| 2005/0147281 A1 | 7/2005 | Wang et al. |
| 2005/0193292 A1 | 9/2005 | Lin et al. |
| 2006/0082557 A1 | 4/2006 | Ericson et al. |
| 2006/0109263 A1 | 5/2006 | Wang et al. |
| 2006/0123049 A1 | 6/2006 | Wang et al. |
| 2006/0125805 A1 | 6/2006 | Marggraff |
| 2006/0182309 A1 | 8/2006 | Wang et al. |
| 2006/0182343 A1 | 8/2006 | Lin et al. |
| 2006/0190818 A1 | 8/2006 | Wang et al. |
| 2006/0204101 A1 | 9/2006 | Wang et al. |
| 2006/0215913 A1 | 9/2006 | Wang et al. |
| 2006/0242560 A1 | 10/2006 | Wang et al. |
| 2006/0242562 A1 | 10/2006 | Wang et al. |
| 2006/0242622 A1 | 10/2006 | Wang et al. |
| 2006/0267965 A1 | 11/2006 | Clary |
| 2006/0274948 A1 | 12/2006 | Wang et al. |
| 2007/0001950 A1 | 1/2007 | Zhang et al. |
| 2007/0003150 A1 | 1/2007 | Xu et al. |
| 2007/0042165 A1 | 2/2007 | Wang et al. |
| 2008/0025612 A1 | 1/2008 | Wang et al. |
| 2009/0110308 A1 | 4/2009 | Wang et al. |
| 2009/0119573 A1 | 5/2009 | Wang et al. |

FOREIGN PATENT DOCUMENTS

| | | |
|---|---|---|
| CN | 1352778 | 6/2002 |
| CN | 3143455 | 9/2003 |
| CN | 200610092487 | 9/2003 |
| EP | 0407734 | 1/1991 |
| EP | 0439682 | 8/1991 |
| EP | 0564708 | 10/1993 |
| EP | 0670555 | 9/1995 |
| EP | 0694870 | 1/1996 |
| EP | 0717368 | 6/1996 |
| EP | 0732666 | 9/1996 |
| EP | 0865166 | 9/1998 |
| EP | 1154377 | 11/2001 |
| EP | 1158456 | 11/2001 |
| EP | 1168231 | 1/2002 |
| EP | 1276073 | 1/2003 |
| EP | 1416435 | 5/2004 |
| GB | 2393149 | 3/2004 |
| JP | 63165584 | 7/1988 |
| JP | 04253087 | 9/1992 |
| JP | 06006316 | 1/1994 |
| JP | 06209482 | 7/1994 |
| JP | 06230886 | 8/1994 |
| JP | 07020812 | 1/1995 |
| JP | 07225564 | 8/1995 |
| JP | 10215450 | 8/1998 |
| JP | 11308112 | 11/1999 |
| JP | 2000131640 | 5/2000 |
| JP | 2002529796 | 9/2000 |
| JP | 2002082763 | 3/2002 |
| JP | 2002108551 | 4/2002 |
| WO | WO-9630217 | 10/1996 |
| WO | WO-9960469 | 11/1999 |
| WO | WO-9965568 | 12/1999 |
| WO | WO-0025293 | 5/2000 |
| WO | WO-0072247 | 11/2000 |
| WO | WO-0073983 | 12/2000 |
| WO | WO-0126032 | 4/2001 |
| WO | WO-0148685 | 7/2001 |
| WO | WO-0171654 | 9/2001 |
| WO | WO-02077870 | 10/2002 |
| WO | WO-2005106638 | 10/2005 |

OTHER PUBLICATIONS

U.S. Appl. No. 11/066,800, Wang.
U.S. Appl. No. 11/067,193, Yang.
U.S. Appl. No. 11/089,189, Wang.
U.S. Appl. No. 11/142,844, Wang.
U.S. Appl. No. 12/131,810, Wang.
U.S. Appl. No. 12/138,339, Wang.
U.S. Appl. No. 12/180,484, Wang.
U.S. Appl. No. 12/138,339, filed Jun. 12, 2008, Wang et al.
"VPEN, Revolutionizing Human Interaction With the Digital World™," OTM Technologies, pp. 1-6, Jul. 15, 2002.
Brush, A.J. et al., "Robust Annotation Positioning in Digital Documents," SIGCHI '01, Mar. 31-Apr. 4, 2001, ACM, Seattle, Washington, USA, pp. 285-292.
Cai, Z., "A New Decode Algorithm for Binary Bar Codes," Pattern Recognition Letters 15 (Dec. 1994), pp. 1191-1199.
Champaneria, "PADCAM: A Real-Time, Human-Centric Notetaking System," MIT Laboratory for Computer Science, Mar. 2002.
Clark et al., "Maximal and Near-Maximal Shift Register Sequences: Efficient Event Counters and Easy Discrete Logarithms," IEEE Transactions on Computers vol. 43, No. 5, pp. 560-568, May 1994.
Cotting, D. et al., "Embedding Imperceptible Patterns into Projected Images for Simultaneous Acquisition and Display," Proceedings of the Third IEEE and ACM International Symposium on Mixed and Augmented Reality, Nov. 2-5, 2004, IEEE Computer Society, Washington, DC, pp. 100-109.
Crowley et al., "*Thingss That See*," Communications of the A.C.M., vol. 43, No. 3, pp. 54-64, Mar. 2000.
Decurtins, C. et al., "Digital Annotation of Printed Documents," Proceedings of the Twelfth International Conference on Information and Knowledge Management Nov. 3-8, New Orleans, Louisiana, United States, CIKM'03. ACM 2003, pp. 552-555.
Dey, et al., "A Fast Algorithm for Computing the Euler Number of an Image and its VLSI Implementation," IEEE; 13th International Conference on VLSI Design, Jan. 2003.
Dumer et al., "Hardness of Approximating the Minimum Distance of a Linear Code," IEEE Symposium of Foundations of Computer Science, pp. 475-485, 1999.
European Search Report for Application No. EP 03021235; Applicant: Microsoft Corporation; Date of Mailing: Jun. 1, 2005 (2 pages).
European Search Report for Application No. EP 03021852; Applicant: Microsoft Corporation; Date of Mailing: Mar. 2, 2004 (3 pages).
European Search Report for Application No. EP 05000170.0/1527; Applicant: Microsoft Corporation; Date of Mailing: Jan. 6, 2005 (7 pages).
European Search Report for Application No. 03021224.5; Applicant: Microsoft Corporation; Date of Mailing: Jun. 1, 2005 (3 pages).
European Search Report for Application No. 03021236.9; Applicant: Microsoft Corporation; Date of Mailing: Sep. 16, 2005 (5 pages).
European Search Report for Application No. 03021237.7-1527, Applicant: Microsoft Corporation; Date of Mailing: Jan. 6, 2005 (4 pages).
European Search Report for Application No. EP050000749; Applicant: Microsoft Corporation; Date of Mailing: Apr. 26, 2007 (2 pages).
European Search Report, Application No. 03021238.5-1527; Applicant: Microsoft Corporation; Date of Mailing: Jun. 1, 2005 (6 pages).
Fujieda et al., "Development of Pen-Shaped Scanners," Nec, vol. 51, No. 10, 1998.
Golovchinsky, G. and Denoue, L., "Moving Markup: Repositioning Freeform Annotations," UIST '02, Oct. 27-30, 2002, Paris, France, vol. 4, Issue 2, pp. 21-24.
Gonzalez, Rafael et al., "Digital Image Processing," Table of Contents and Preface, Second Edition, Prentice Hall, Upper Saddle River, New Jersey, 2002 (13 pages).
Grasso et al., "Augmenting Recommender Systems by Embedding Interfaces into Practices," pp. 267-275, 1999.
Guerrero, J.J. and Sagues, C. "From Lines to Homographies Between Uncalibrated Images," IX Symposium on Pattern Recognition and Image Analysis, VO4, 233-240, 2001.
Haynes, "Wacom PL-500," www.wacom.co.uk, Jul. 15, 2002.
Hecht, D.L., "Printed embedded data graphical user interfaces," Computer vol. 34, Issue 3, Mar. 2001, pp. 47-55.
IEExplore # Search Session History, May 7, 2008, http://ieee.org/search/history.jsp, 1 page.
International Search Report for Application No. PCT/US2006/032230; Applicant: Microsoft Corporation; Date of Mailing: Jan. 9, 2007 (3 pages).

Internet Print Out: "(Electro-Magnetic Resonance) send and position sensing technology," Wacom, Technology, http://www.wacom-components.com/tech.asp, pp. 1-6, Jul. 15, 2002.
Internet Print Out: "Anoto Pen Bluetooth," Tabletpccorner, http://www.tabletpccorner.net, dated Sep. 5, 2003.
Internet Print Out: "Competitive Technologies' Investee Introduces N-Scribe Pen—Digital Ink Presents Wireless Pen At Demo 2001," Competitive Technologies, http://www.competitivetech, dated Sep. 5, 2003.
Internet Print Out: "Cordless Batteryless Pen," Wacom Penabled, Components, http://www.wacom.com/components/index.cfm, dated Jul. 15, 2002.
Internet Print Out: "DataGlyphs®: Embedding Digital Data," Parc Solutions, http://www.parc.com/solutions/dataglyphs/, dated Jul. 15, 2002.
Internet Print Out: "Digital Pens," http://www.anotofunctionality.com/navigate.asp?PageID=96, pp. 1-70, Sep. 26, 2002.
Internet Print Out: "Jot This—Nscribe Pen," PC Magazine, http://ww.pcmag.com/article2/0,4149,316500,00.asp, dated Jul. 15, 2002.
Internet Print Out: "Jot This—Nscribe Pen," PC Magazine, http://ww.pcmag.com/article2/0,4149,316500,00.asp, dated Sep. 5, 2003.
Internet Print Out: "Maxell Digital Pen to Use Anoto System," Gizmo, http://www.gizmo.com.au/, dated Sep. 5, 2003.
Internet Print Out: "Mimio—Products," Mimio, http://www.mimio.com, pp. 1-8, Sep. 5, 2003.
Internet Print Out: "*N-Scribe for Digital Writing,*" Flash Commerce News, http://flashcommerce.com/articles/, dated Sep. 5, 2003.
Internet Print Out: "N-Scribe for Digital Writing," Mobileinfo.com, News issue #2001—15 (Apr. 2001), http://www.mobileinfo.com/News_2001/Issue15/Digital-nscribe.htm, dated Jul. 15, 2002.
Internet Print Out: "Navilite—Optical Opportunities—Bluetooth-enabled optical transition measurement technology paves the way for an untethered stylus that can write on any surface," vol. 8, Issue No. 34, Jul. 5-11, 2002. www.computerworld.com, dated Aug. 15, 2002.
Internet Print Out: "OTM Technologies—V Pen," searched http://www.otmtech.com/vpen3.asp, pp. 1-7, Jul. 15, 2002.
Internet Print Out: "PL-500—15.1 inch Screen Digital LCD Pen Tablet System," Wacom Graphics Tablet Solution, http://ap.wacm.co.jp/products/pl/contents/pl500.html, pp. 1-13, 2002.
Internet Print Out: "Preprocessing in the Npen++ System," http://www.is.cs.cmu.edu/mie/multimodal_npen_preproc.html, dated Aug. 8, 2002.
Internet Print Out: "RF Pen Sends Your Scribbles," Appliance Manufacturing Magazine, http://www.ammagazine.com. Dated Sep. 26, 2002.
Internet Print Out: "SMART Board Interactive Whiteboard," Smarttech, http://www.smarttech.com, pp. 1-26, Sep. 5, 2003.
Internet Print Out: "The Hot New Medium: Paper—How The Oldest Interface In The Book is Redrawing The Map Of The Networked World," http://www.wired.com/wired/, dated Sep. 5, 2003.
Internet Print Out: "Anoto functionality," News, dated Jul. 15, 2002.
Internet Print Out: "Anoto functionality," Showroom, dated Jul. 15, 2002.
Internet Print Out: "ChatPen CHA-30," Digital Pens, Anoto Functionality, dated Jul. 15, 2002.
Internet Print Out: "Cintig18SX—A Powerful New Way To Work Directly On The Screen," Wacom Technology, Cintig-Interactive Pen Display, dated Sep. 5, 2003.
Internet Print Out: "Communicate Digitally With Ordinary Pen and Paper," Anoto Functionality, dated Jul. 15, 2002.
Internet Print Out: "Creating A Global De Facto Standard," Anoto Functionality, dated Jul. 15, 2002.
Internet Print Out: "Daily News," dated Aug. 15, 2002.
Internet Print Out: "Digital Pens and Technical Data," Anoto Functionality, dated Jul. 15, 2002.
Internet Print Out: "Downloads," Anoto Functionality, dated Jul. 15, 2002.
Internet Print Out: "Optical Translation Measurement (OTM™)," Technologies, dated Jul. 15, 2002.
Internet Print Out: "Partners Supporting Anoto Functionality," Anoto Functionality, dated 15, 2002.
Internet Print Out: "Possibilities," Anoto Functionality, dated Jul. 15, 2002.
Internet Print Out: "Product VPen™," OTM Technologies, dated Jul. 15, 2002.
Internet Print Out: "Products—Get Everyone On The Same Page," Mimio, dated Sep. 5, 2003.
Internet Print Out: "Sensor Board and Pen," Wacom, Product, dated Jul. 15, 2002.
Internet Print Out: "The Solution," Anoto Functionality, dated Jul. 15, 2002.
Internet Print Out: "Vision and Mission," Anoto Functionality, dated Jul. 15, 2002.
Internet Print Out: "Wacom Displays Pressure-Sensitive Pen Sensor for Tablet PCs," Wacom, News, dated Jul. 15, 2002.
Internet Print Out: "Welcome To www.anoto.com," Anoto, dated Jul. 15, 2002.
Internet Printout—http://www.anoto.com: Construction, Sep. 5, 2003.
Internet Printout—http://www.anoto.com: Page template, Sep. 5, 2003.
Internet Printout—http://www.anoto.com: Paper and Printing, Sep. 5, 2003.
Internet Printout—http://www.anoto.com: Paper space, Sep. 5, 2003.
Internet Printout—http://www.anoto.com: Pattern, Sep. 5, 2003.
Internet Printout—http://www.anoto.com: Printers supporting Anoto functionality, Sep. 5, 2003.
Internet Printout—http://www.anotofunctionality.com: Anoto Functionality—Anoto pattern & digital paper, Sep. 26, 2002.
Internet Printout—http://www.anotofunctionality.com: Anoto Functionality—Anoto pattern & digital paper, Sep. 5, 2003.
Internet Printout—http://www.anotofunctionality.com: Anoto Functionality—Applications, Sep. 5, 2003.
Internet Printout—http://www.anotofunctionality.com: Anoto Functionality—Corporate applications, Sep. 5, 2003.
Internet Printout—http://www.anotofunctionality.com: Anoto Functionality—Digital notes, Sep. 5, 2003.
Internet Printout—http://www.anotofunctionality.com: Anoto Functionality—Digital paper, Sep. 26, 2002.
Internet Printout—http://www.anotofunctionality.com: Anoto Functionality—Digital paper, Sep. 5, 2003.
Internet Printout—http://www.anotofunctionality.com: Anoto Functionality—Digital pens Use with mobile phones, Sep. 5, 2003.
Internet Printout—http://www.anotofunctionality.com: Anoto Functionality—Digital Pens Use with personal computers, Sep. 26, 2002.
Internet Printout—http://www.anotofunctionality.com: Anoto Functionality—Digital Pens, Sep. 26, 2002.
Internet Printout—http://www.anotofunctionality.com: Anoto Functionality—Digital pens, Sep. 5, 2003.
Internet Printout—http://www.anotofunctionality.com: Anoto Functionality—Digital service, Sep. 26, 2002.
Internet Printout—http://www.anotofunctionality.com: Anoto Functionality—Digital service, Sep. 5, 2003.
Internet Printout—http://www.anotofunctionality.com: Anoto Functionality—E-mail, Sep. 5, 2003.
Internet Printout—http://www.anotofunctionality.com: Anoto Functionality—Fax, Sep. 5, 2003.
Internet Printout—http://www.anotofunctionality.com: Anoto Functionality—Freedom of expression, Sep. 26, 2002.
Internet Printout—http://www.anotofunctionality.com: Anoto Functionality—Graphical SMS, Sep. 5, 2003.
Internet Printout—http://www.anotofunctionality.com: Anoto Functionality—Hints & tips Using your digital paper, Sep. 5, 2003.
Internet Printout—http://www.anotofunctionality.com: Anoto Functionality—Hints & tips Using your digital pen, Sep. 5, 2003.
Internet Printout—http://www.anotofunctionality.com: Anoto Functionality—Hints & tips Using Your Digital Service, Sep. 5, 2003.
Internet Printout—http://www.anotofunctionality.com: Anoto Functionality—Hints & tips, Sep. 5, 2003.
Internet Printout—http://www.anotofunctionality.com: Anoto Functionality—How does it work?, Sep. 26, 2002.
Internet Printout—http://www.anotofunctionality.com: Anoto Functionality—Security, Sep. 5, 2003.

Internet Printout—http://www.anotofunctionality.com: Anoto Functionality—Software and additionals, Sep. 5, 2003.
Internet Printout—http://www.anotofunctionality.com: Anoto Functionality—What is Anoto functionality?, Sep. 5, 2003.
Internet Printout—http://www.anotofunctionality.com: Anoto Functionality—You to an organization, Sep. 26, 2002.
Internet Printout—http://www.anotofunctionality.com: Anoto Functionality—You to someone else, Sep. 26, 2002.
Internet Printout—http://www.anotofunctionality.com: Anoto Functionality—You to yourself, Sep. 26, 2002.
Internet Printout—http://www.anotofunctionality.com: Anoto® functionality brings digital life to paper products, Sep. 5, 2003.
Internet Printout—http://www.edgereview.com: The Edge—First Look: Digital Ink n-scribe, Sep. 5, 2003.
Internet Printout—http://www.flashcommerce.com: n-scribe for Digital Writing, Sep. 5, 2003.
Internet Printout—http://www.gizmo.com: Maxell Digital Pen to use Anoto system, Sep. 5, 2003.
Internet Printout—http://www.is.cs.cmu.edu: Final input representation, Aug. 8, 2002.
Internet Printout—http://www.is.cs.cmu.edu: Npen++, Aug. 8, 2002.
Internet Printout—http://www.mimio.com: Capture, Save and Share, Sep. 5, 2003.
Internet Printout—http://www.mimio.com: Mimio technology, Sep. 5, 2003.
Internet Printout—http://www.mimio.com: Turn your whiteboard into an interactive whiteboard, Sep. 5, 2003.
Internet Printout—http://www.pcmag.com: Jot This, Sep. 5, 2003.
Internet Printout—http://www.smarttech.com: Carnegie Mellon research ranks the SMART Board™ interactive whiteboard as fastest, most accurate way to interact with projected information, Sep. 5, 2003.
Internet Printout—http://www.smarttech.com: SMART Board Interactive Whiteboard—Front Projection Features, Sep. 5, 2003.
Internet Printout—http://www.smarttech.com: SMART Board Interactive Whiteboard—Q&A, Sep. 5, 2003.
Internet Printout—http://www.smarttech.com: SMART Board Interactive Whiteboard, Sep. 5, 2003.
Internet Printout—http://www.smarttech.com: SMART Camfire™, whiteboard camera system effortlessly saves dry-erase whiteboard notes, Sep. 5, 2003.
Internet Printout—http://www.smarttech.com: SMART Technologies Inc. awarded another U.S. patent for touch sensitive SMART Board™ technology, Sep. 5, 2003.
Internet Printout—http://www.smarttech.com: SMART Technologies, Inc. Press Releases, Sep. 5, 2003.
Internet Printout—http://www.smarttech.com: SMART Technologies, Inc., New annotation and software functionality on all SMART Board™ Interactive Whiteboards, Sep. 5, 2003.
Internet Printout—http://www.smarttech.com: What's New, Sep. 5, 2003.
Internet Printout—http://www.smarttech.com: Press Releases—SMART launches Research Assistance Program, Sep. 5, 2003.
Internet Printout—http://www.smarttech.com: SMART Board Interactive Whiteboard Profiles—Sep. 5, 2003.
Internet Printout—http://www.smarttech.com: SMART Board Software Features—Sep. 5, 2003.
Internet Printout—http://www.tabletpccorner.com: Anoto Pen Bluetooth, Sep. 5, 2003.
Internet Printout—http://www.techtv.com: Nscribe Pen and Presenter-to-Go, Sep. 5, 2003.
Internet Printout—http://www.wacom.com: Cintiq—Interactive Pen Display, Sep. 5, 2003.
Internet Printout—http://www.wacom.com: Graphire2—Have more fun with digital phones, Sep. 5, 2003.
Internet Printout—http://www.wacom.com: Intuos2—The Professional Tablet, Sep. 5, 2003.
Internet Printout—http://www.wacom.com: intuos2, Sep. 5, 2003.
Internet Printout—http://www.wacom.com: Penabled Wacom, Sep. 5, 2003.
Internet Printout—http://www.wacom.com: tablet PC, Sep. 5, 2003.
Internet Printout—http://www.wired.com: The Hot New Medium: Paper, Sep. 5, 2003.
Jelinek, Frederic, "Statistical Methods for Speech Recognition," The MIT Press, pp. 1-283, 2001.
Ko et al., "Finger Mouse and Gesture Recognition System As A New Human Computer Interface," Computer and Graphics, col. 21, No. 5, pp. 555-561, 1997.
Lau, R., "Adaptive Statistical Language Modeling," Submitted to the Dept. of Electrical Engineering and Computer Science in Partial Fulfillment for the Degree of Master of Science at the MIT, May 1994.
Lee, Kai-Fu, "Automatic Speech Recognition—The Development of the SPHINX System," Kluwer Academic Publishers, pp. 1-207, 1992.
Louderback, JiM, "Nscribe pen and Presenter-To-Go—Infrared Pen And New Springboard Module Make Their Debut At Demo 2001," Edgereview.com, http://www.techtv.com/freshgear.pr, dated Sep. 5, 2003.
Moran, et al., "Design and Technology for Collaborage: Collaborative Collages of Information on Physical Walls," Nov. 1999.
Munich, M.E.; Perona, P., "Visual Input for Pen-Based Computers," Image Processing, 1996, Proceedings International Conference on Sep. 16-19, 1996. vol. 1, pp. 173-176.
Nathan, K.S. et al., "On-Line Handwriting Recognition Using Continuous Parameter Hidden Markov Models," 1993 IEEE.
Okad, et al. "A Method for Document Digitizer by Real Time Assembling of Mosaic Pictures," Scripta Publishing Co., Systems, Computers, Controls, vol. 13, No. 5, Sep. 1982, pp. 74-80.
Okada et al., "A High-Resolution Handwriting Character Input Device Using Laser Beams," Department of Instrumentation Engineering, Faculty of Science and Technology, vol. 10.4, No. 11.1, 1981.
Otsu, Nobuyuki, "A Threshold Selection Method From Gray-Level Histogram," IEEE Transactions on Systems, Man, and Cybernetics; Jan. 1979, vol. SMC-9, No. 1, pp. 62-66.
Pursley, M. et al., "Numerical Evaluation of Correlation Parameters for Optimal Phrases of Binar Register Sequences," Communications, IEEE Transactions on Oct. 1979, vol. 27, Issue 10, Part 1, pp. 1597-1604.
Reynaerts, D. et al., "Design of an advanced computer writing tool," Micro Machine and Human Science, 1995, Proceedings of the Sixth International Symposium, Nagoya, Japan, Oct. 4-6, 1995, pp. 229-234.
Sato et al., "Novel device for Inputting Handwriting Trajectory," RICOH Technical Report No. 27, Nov. 2001, pp. 52-59, http://www.ricoh.co.jp/rdc/techreport/No27/Ronbun/A2707.pdf.
Sato et al., "Video Tablet—2D Coordinate Input Device With OCD Camera," Osaka University, vol. J67-D, No. 6, Jun. 1984.
Shum, Heung-Yeung, et al., "Panoramic Image Mosaics," Microsoft Research Technical Report MSR-TR-97-23, 1997, 53 pages.
Tang, Xiaoou et al., "Video-based handwritten Chinese character recognition," Circuits and Systems for Video Technology, IEEE Transactions, Jan. 2005, vol. 15, Issue 1, pp. 167-174.
Urbanski, Brian, "Don't Break This Ink Pen," Edgereview.com, http://www.edgereview.com/ataglance.cfm?category=edge&ID=180, dated Jul. 15, 2002.
Urbanski, Brian, "Don't Break This Ink Pen," Edgereview.com, http://www.edgereview.com/ataglance.cfm?category=edge&ID=180, dated Sep. 5, 2003.
Van Liere, R. and Mulder, J.D., "Optical Tracking Using Projective Invariant Marker Pattern Properties," Virtual Reality, 2003. Proceedings, IEEE, Mar. 22-26, 2003, pp. 191-198.

* cited by examiner

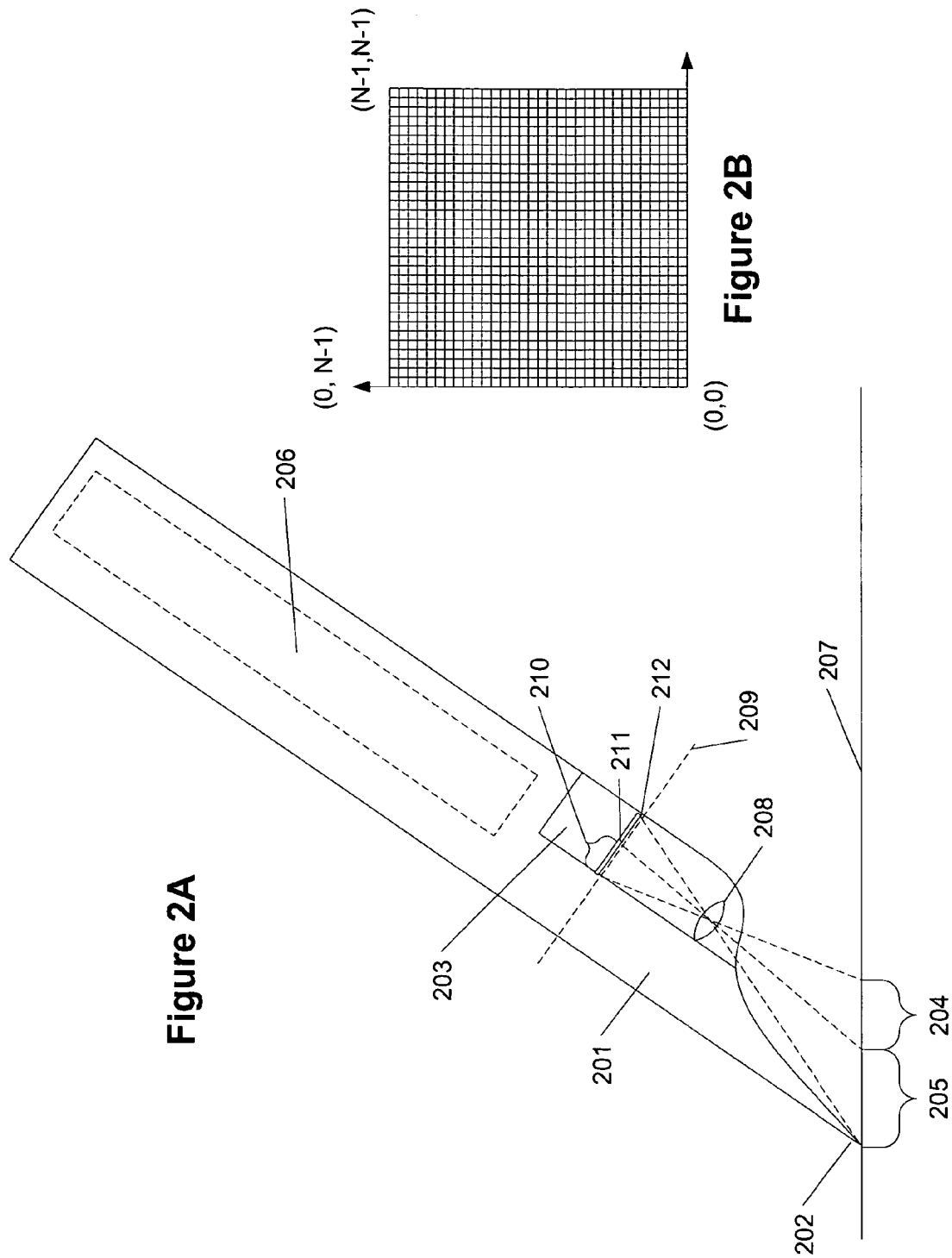

Figure 3A  0000010 00 01100 0101 001 111010 0 011001 0 010110 111 0110 01101 01 0111111
Figure 3B  0000000 0011101 0100111 1110100 0111010 1000101 1110100 0100111 0011101
Figure 3C  000100100 001111110 010111101 010011001 011100111 001011010 011000011
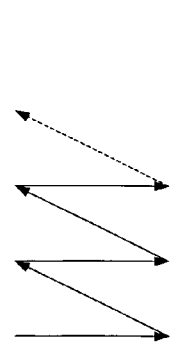
Figure 3E
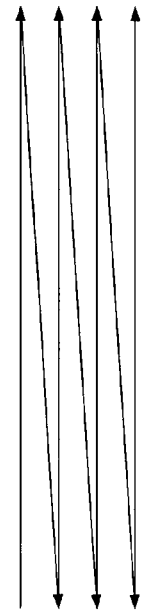
Figure 3F
Figure 3D

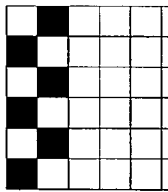
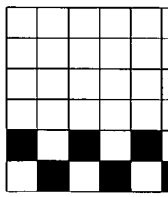
Figure 4C
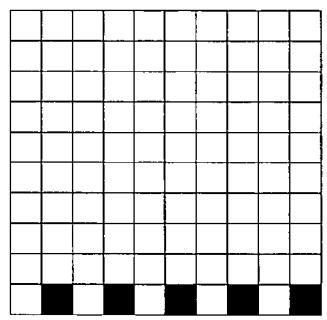
Figure 4D
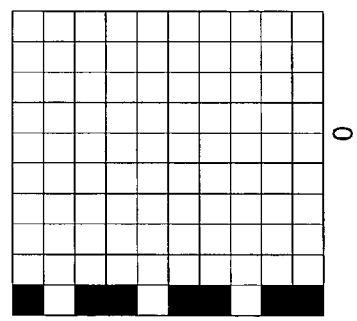
Figure 4E
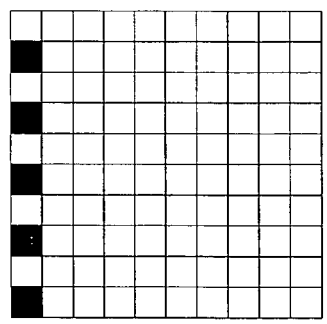
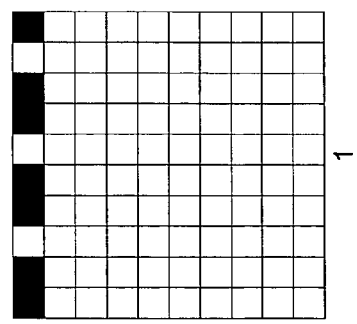

$$o = \theta + \begin{cases} 0 - no\ a \\ \dfrac{\pi}{2} - no\ b \\ \pi - no\ c \\ \dfrac{3\pi}{2} - no\ d \end{cases}$$

EMBEDDED INTERACTION CODE ENABLED SURFACE TYPE IDENTIFICATION

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations made on it by the user. One of the difficulties, however, with having a printed document with annotations is the need to have the annotations subsequently entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations would be desirable.

One technique for capturing handwritten information is by using an image capturing pen whose location may be determined during writing. One image capturing pen that provides this capability is the Anoto pen by Anoto Inc. This pen functions by using a camera to capture an image of paper encoded with a predefined pattern. An example of the image pattern is shown in FIG. 11. This pattern is used by the Anoto pen to determine a location of the pen on a piece of paper (or other positionally encoded medium).

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

At least one image captured from a printed document and at least one image captured from a display surface other than a printed document are processed. A surface-type-identification module accepts as input both types of images and identifies, for a particular image, the type of surface from which the image was captured. A display-surface-preprocessing module preprocesses the at least one embedded-interaction-code image captured from a display surface other than a printed document. A printed-document-preprocessing module preprocesses the at least one embedded-interaction-code images captured from a printed document. An embedded-interaction-code-processing module outputs location information for at least one of the at least one image captured from a printed document and the at least one image captured from a display surface other than a printed document.

BRIEF DESCRIPTION OF THE DRAWINGS

The foregoing Summary, as well as the following Detailed Description, is better understood when read in conjunction with the accompanying drawings, which are included by way of example, and not by way of limitation, with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

FIGS. 4A through 4E show various encoding systems in accordance with embodiments of the present invention.

DETAILED DESCRIPTION

The following is separated by subheadings for the benefit of the reader. The subheadings include: terms, general-purpose computer, image capturing pen, encoding of array, decoding, error correction, location determination, and embedded interaction code enabled surface type identification.

Terms

Pen—any writing implement that may or may not include the ability to store ink. In some examples, a stylus with no ink capability may be used as a pen in accordance with embodiments of the present invention.

Camera—an image capture system that captures an image from paper or any other medium.

General Purpose Computer

Figure 1:
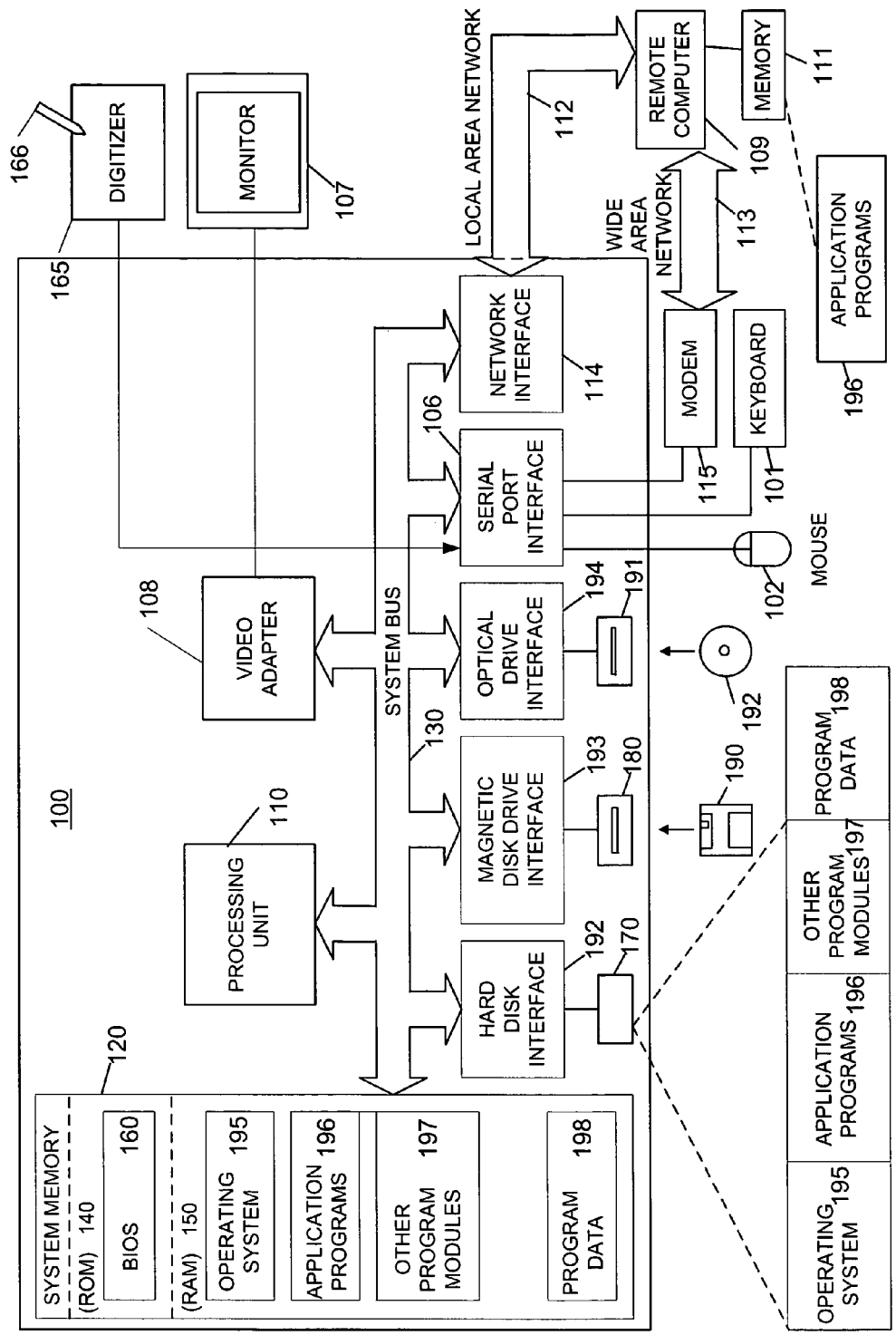
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \rightarrow P}$ transforms position coordinates in the image captured by camera to position coordinates in the real image on the paper:

$$L_{paper} = F_{S \rightarrow P}(L_{Sensor}).$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip}).$$

The transformation $F_{S \rightarrow P}$ may be estimated as an affine transform, which approximates $F_{S \rightarrow P}$ as:

$$F'_{S \rightarrow P} = \begin{bmatrix} \dfrac{\sin \theta_y}{s_x} & \dfrac{\cos \theta_y}{s_x} & 0 \\ \dfrac{-\sin \theta_x}{s_y} & \dfrac{\cos \theta_x}{s_y} & 0 \\ 0 & 0 & 1 \end{bmatrix},$$

in which $\theta_x$, $\theta_y$, $s_x$, and $s_y$ are the rotation and scale of two orientations of the pattern captured at location 204. Further, one can refine $F'_{S \rightarrow P}$ by matching the captured image with the corresponding real image on paper. "Refine" means to get a more precise estimation of the transformation $F_{S \rightarrow P}$ by a type of optimization algorithm referred to as a recursive method. The recursive method treats the matrix $F'_{S \rightarrow P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip}),$$

where $L_{pentip}$ is initialized as (0, 0) and $$F_{P \to S} = (F_{S \to P})^{-1}.$$

By averaging the $L_{virtual-pentip}$ obtained from each image, a location of the virtual pen tip $L_{virtual-pentip}$ may be determined. With $L_{virtual-pentip}$, one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip}).$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a particular length (or window size). The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$, where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)},$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence. In our implementation, q is chosen as 2.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1,l)=A(k,l+m_2)=A(k,l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L=m_1 \times m_2=2^n-1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L=2^n-1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$ is created from the sequence $\{a_i\}$ by letting each bit of the array be calculated as shown by equation 1:

$$b_{kl}=a_i, \text{ where } k=i \bmod(m_1), l=i \bmod(m_2), i=0, \ldots, L-1. \quad (1)$$

This folding approach may be alternatively expressed as laying the sequence on the diagonal of the array, then continuing from the opposite edge when an edge is reached.

Figure 4A:
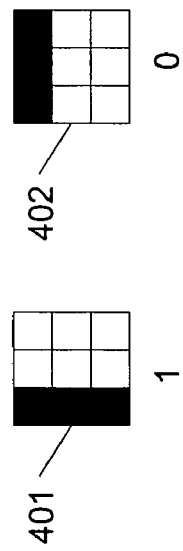
Figure 11:
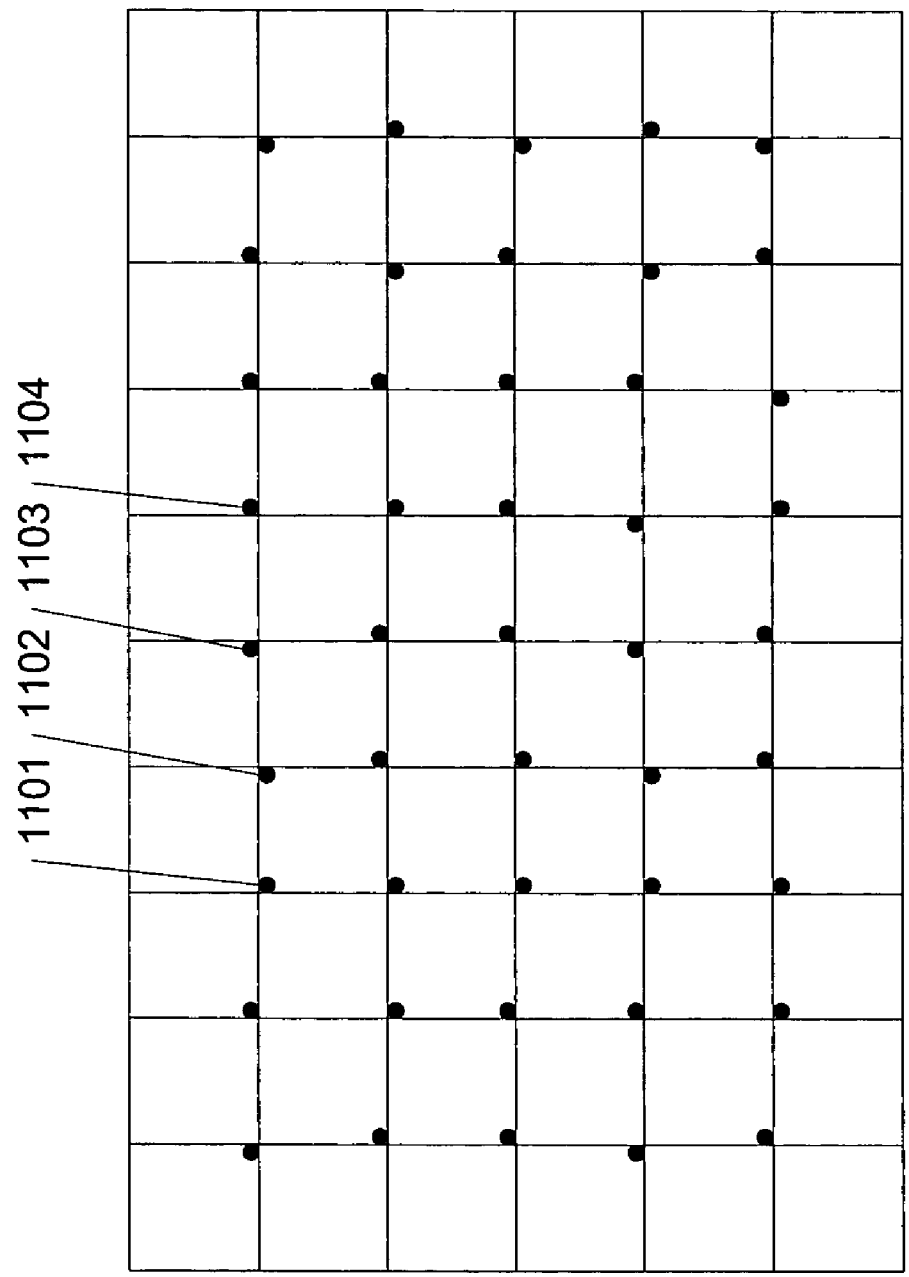
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

Figure 4B:
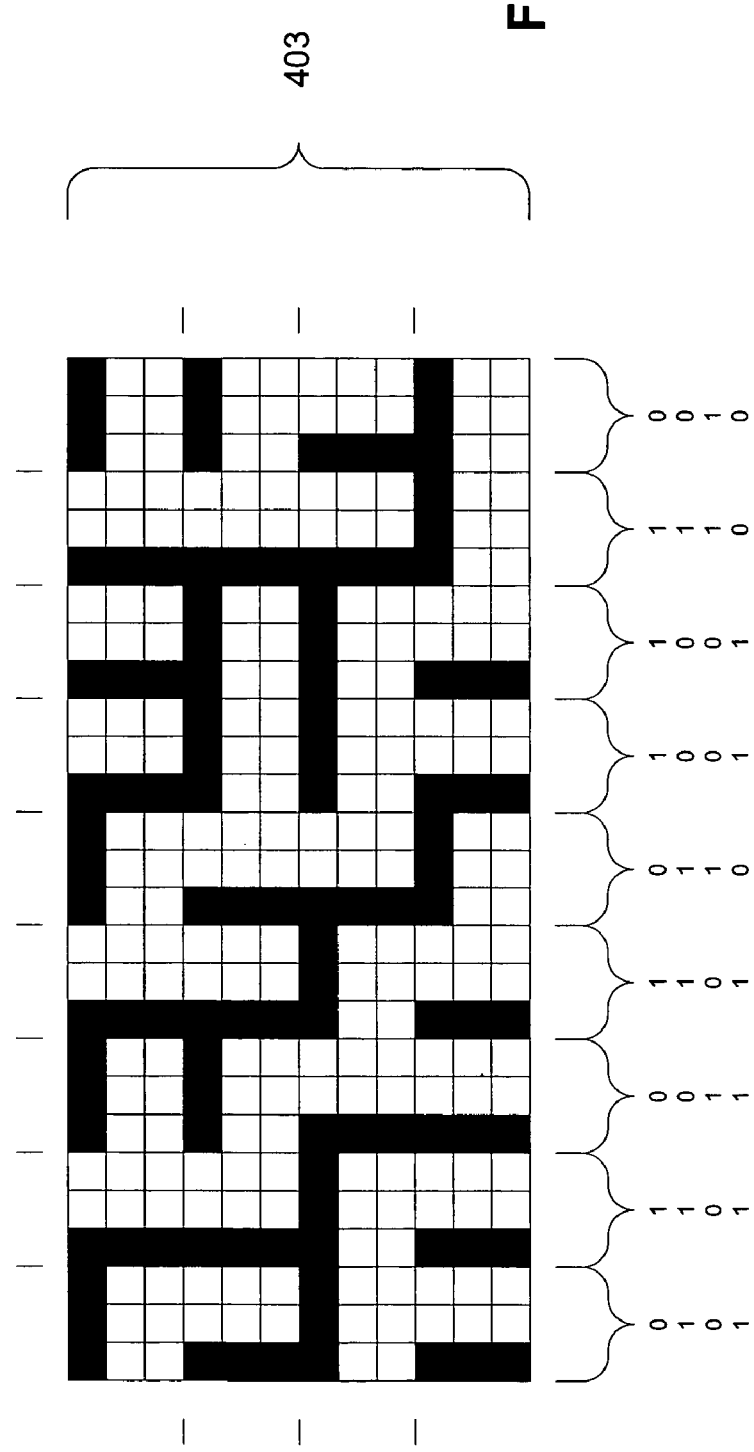

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

Figure 5A:
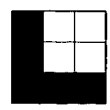
FIGS. 5A through 5D show four possible resultant corners associated with the encoding system according to FIGS. 4A and 4B.
Figure 5B:
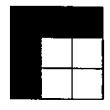
Figure 5C:
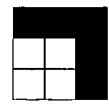
Figure 5D:
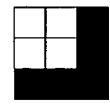

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
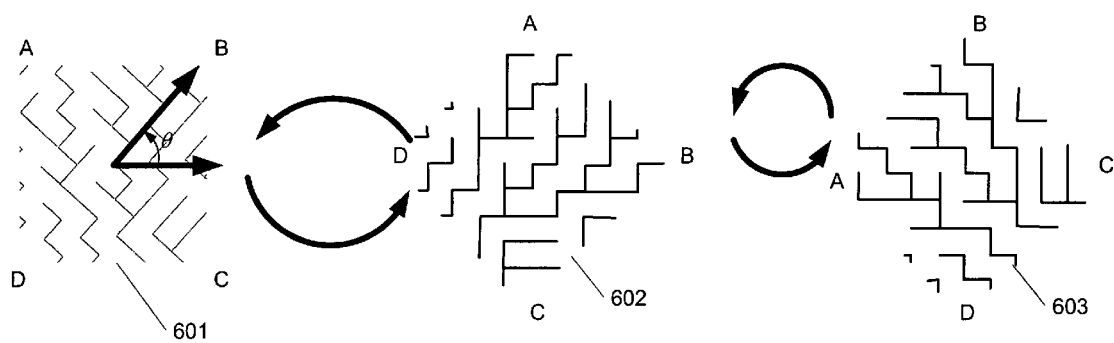
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counterclockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, EIC pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0 \ b_1 \ b_2 \ldots b_{k-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T^s(I)$, where T is the cyclic shift operator. We find this s indirectly. The polynomials modulo $P_n(x)$ form a field. It is guaranteed that $x^s \equiv r_0+r_1x+ \ldots r_{n-1}x^{n-1} \mod(P_n(x))$. Therefore, we may find $(r_0, r_1, \ldots, r_{n-1})$ and then solve for s.

The relationship $x^s \equiv r_0+r_1x+ \ldots r_{n-1}x^{n-1} \mod(P_n(x))$ implies that $R=r_0+r_1T(I)+ \ldots +r_{n-1}T^{n-1}(I)$. Written in a binary linear equation, it becomes:

$$R=r^t A \quad (2)$$

where $r=(r_0 \ r_1 \ r_2 \ldots r_{n-1})^t$, and $A=(I \ T(I) \ \ldots \ T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1, 2, ..., k−1, then the $1^{st}$ and $(k_i+1)$-th elements of R, i=1, 2, ..., k−1, are exactly $b_0$, $b_1$, ..., $b_{k-1}$. By selecting the $1^{st}$ and $(k_i+1)$-th columns of A, i=1, 2, ..., k−1, the following binary linear equation is formed:

$$b^t = r^t M \qquad (3)$$

where M is an n×K sub-matrix of A.

If b is error-free, the solution of r may be expressed as:

$$r^t = \tilde{b}^t \tilde{M}^{-1} \qquad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logorithms," IEEE Transactions on Computers 43.5 (May 1994, pp 560-568) to find s so that $x^s \equiv r_0 + r_1 x + \ldots r_{n-1} x^{n-1} \bmod(P_n(x))$.

As matrix A (with the size of n by L, where $L = 2^n - 1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L = 2^n - 1$) is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
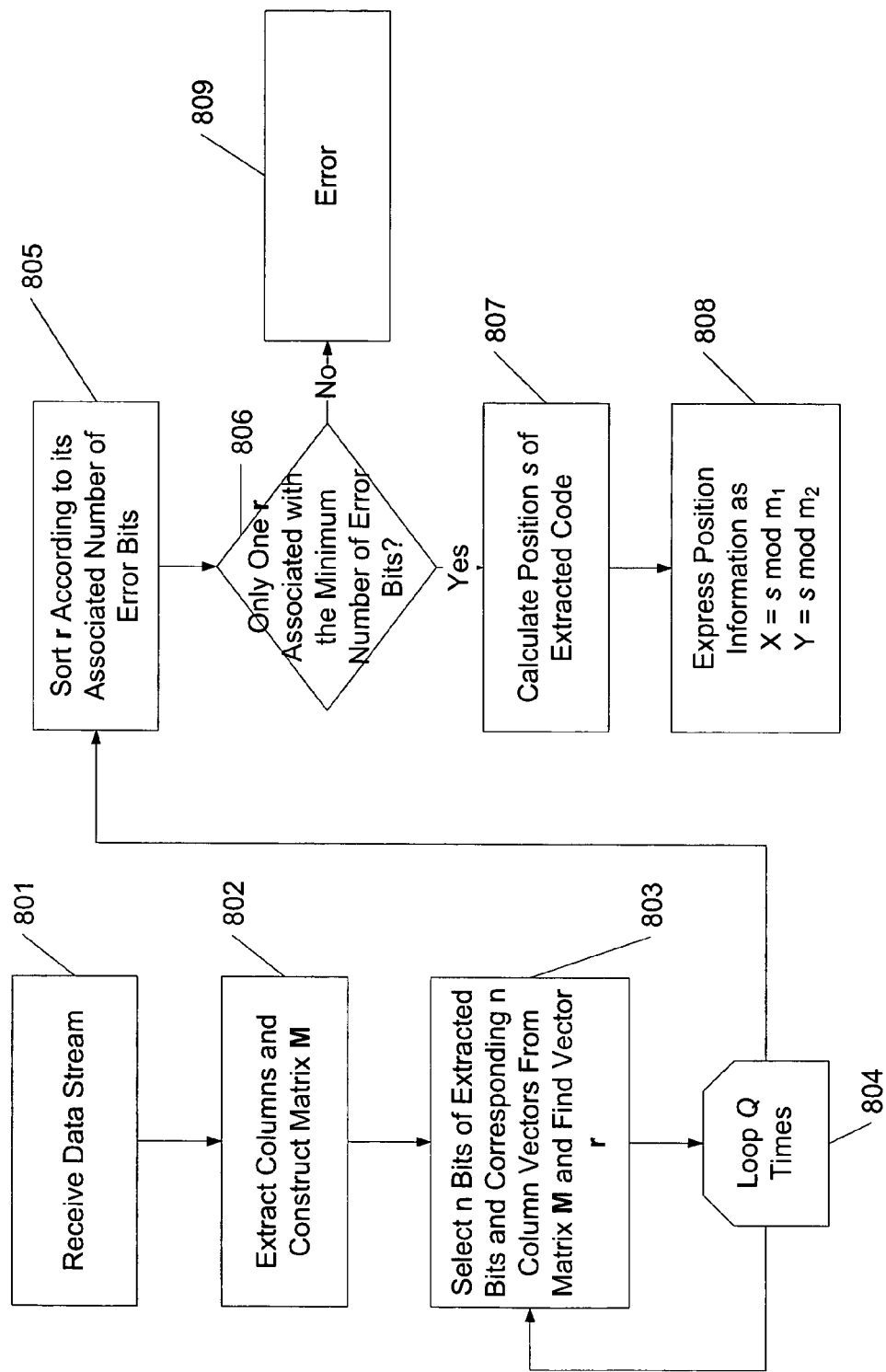
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

Location Determination

Figure 9:
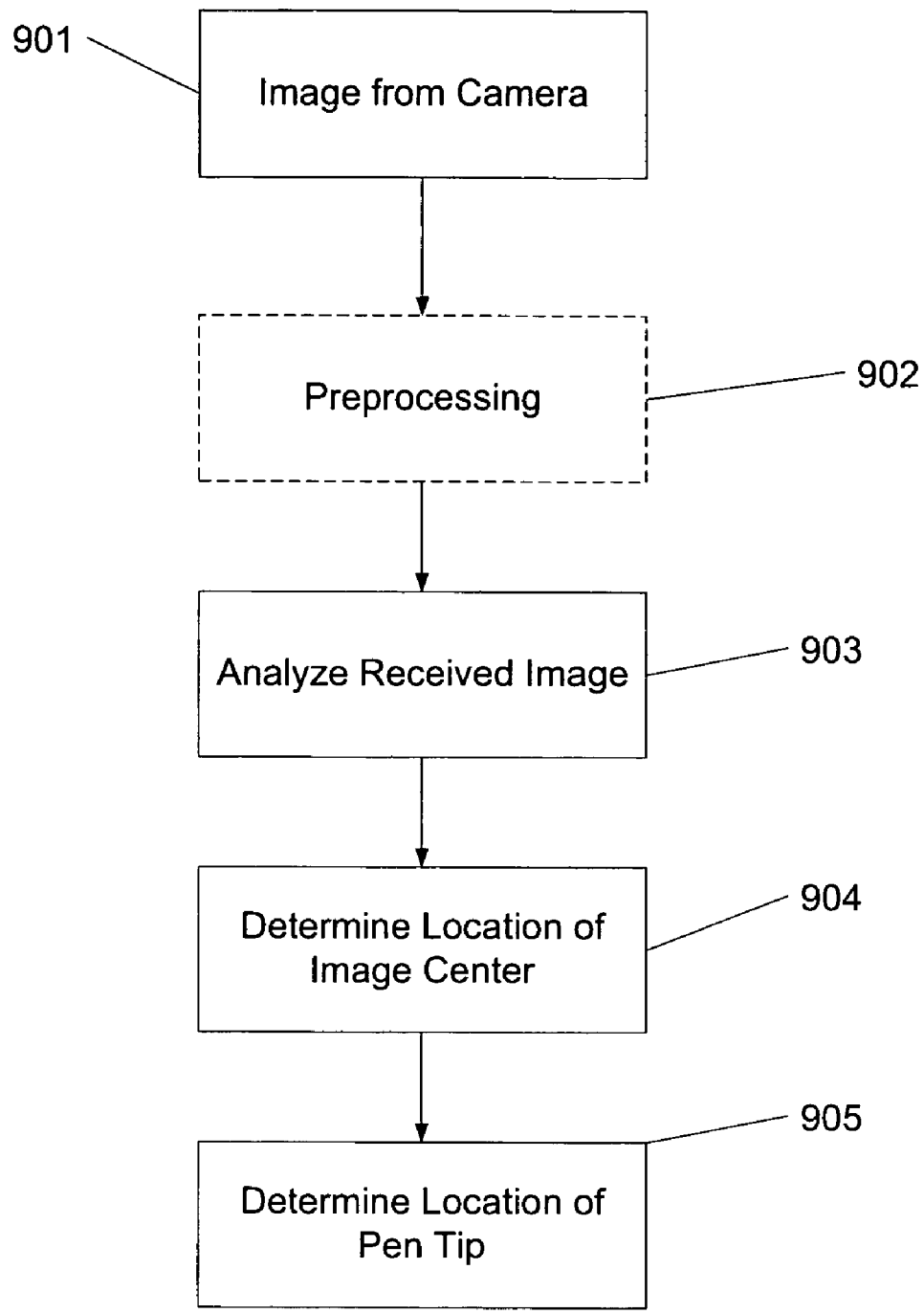
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
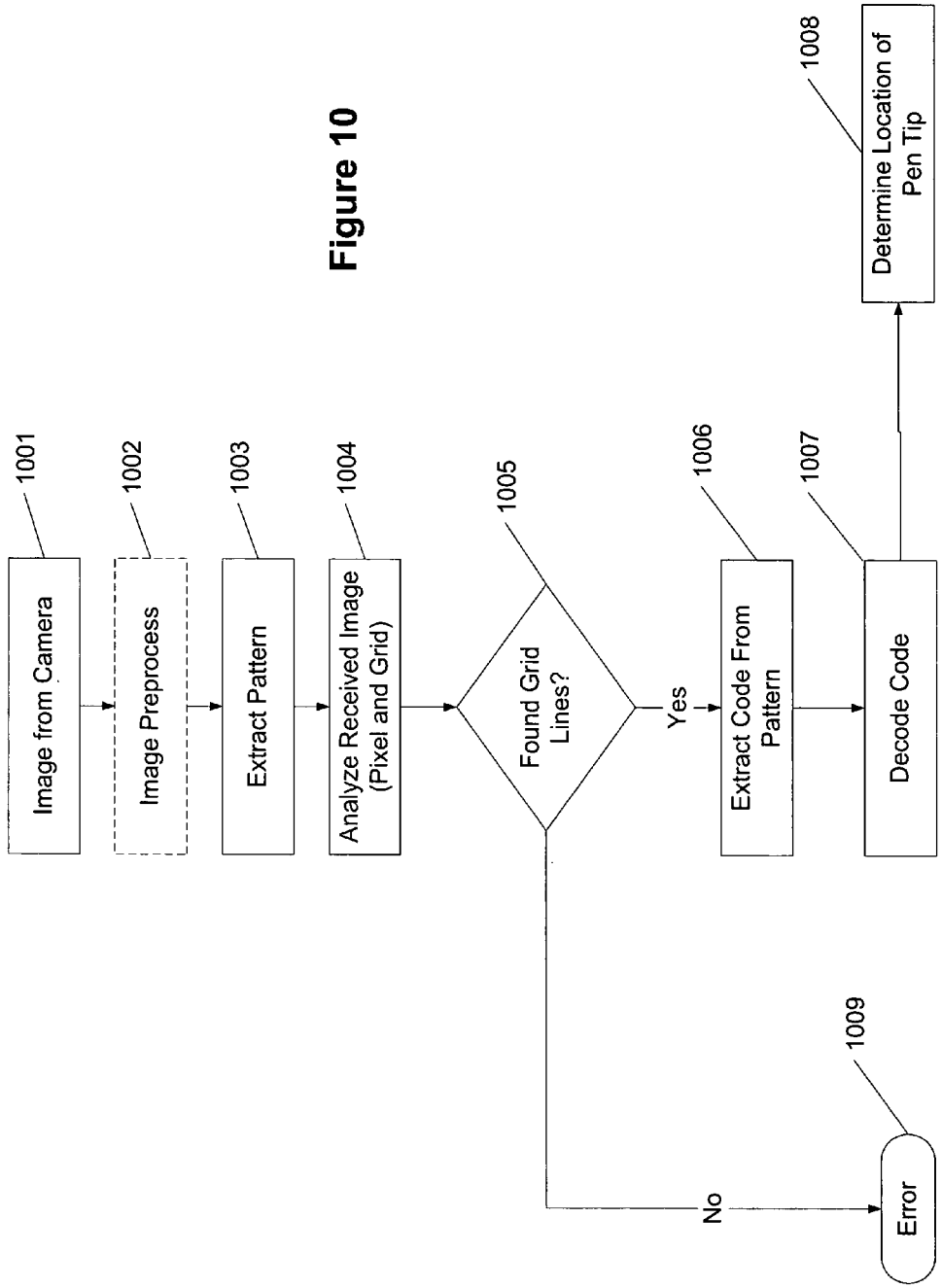
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Outline of Enhanced Decoding and Error Correction Algorithm

Figure 12:
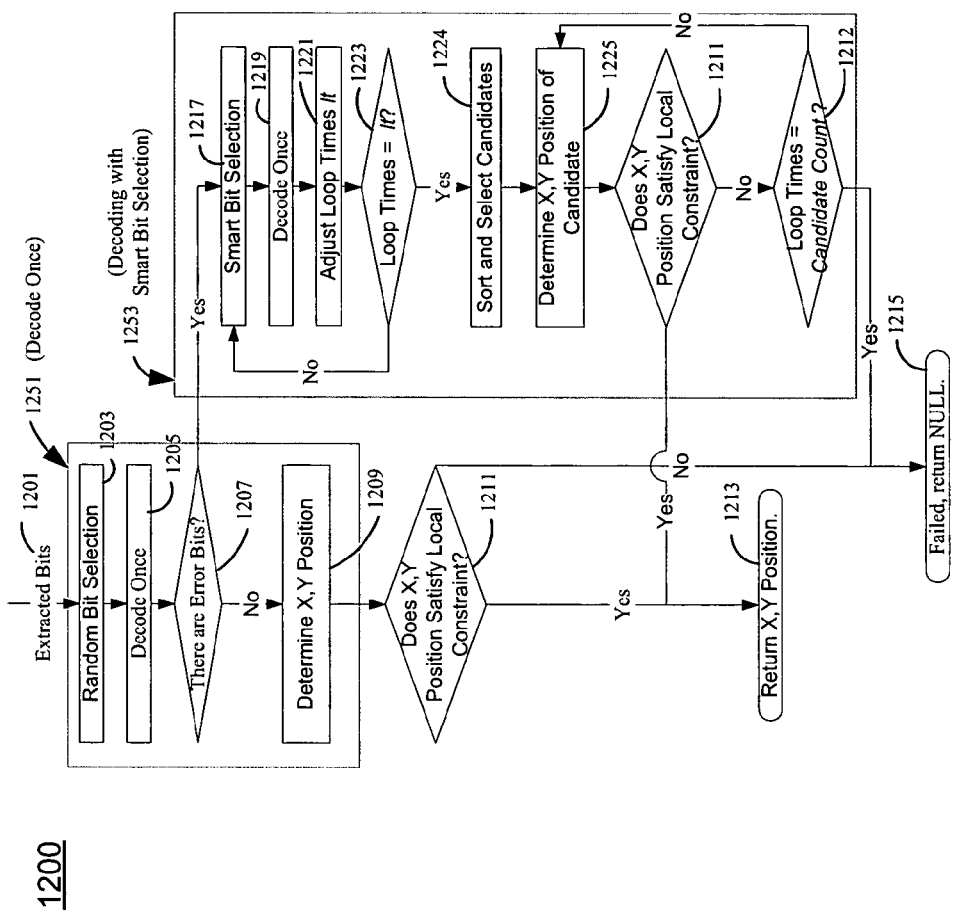
FIG. 12 shows a flow diagram for decoding extracted bits from a captured image in accordance with embodiments of the present invention.

With an embodiment of the invention as shown in FIG. 12, given extracted bits 1201 from a captured image (corresponding to a captured array) and the destination area, a variation of an m-array decoding and error correction process decodes the X,Y position. FIG. 12 shows a flow diagram of process 1200 of this enhanced approach. Process 1200 comprises two components 1251 and 1253.

Decode Once. Component 1251 includes three parts.
   random bit selection: randomly selects a subset of the extracted bits 1201 (step 1203)
   decode the subset (step 1205)
   determine X,Y position with local constraint (step 1209)

Decoding with Smart Bit Selection. Component 1253 includes four parts.
   smart bit selection: selects another subset of the extracted bits (step 1217)
   decode the subset (step 1219)
   adjust the number of iterations (loop times) of step 1217 and step 1219 (step 1221)
   determine X,Y position with local constraint (step 1225)

The embodiment of the invention utilizes a discreet strategy to select bits, adjusts the number of loop iterations, and determines the X,Y position (location coordinates) in accordance with a local constraint, which is provided to process 1200. With both components 1251 and 1253, steps 1205 and 1219 ("Decode Once") utilize equation (4) to compute r.

Let $b$ be decoded bits, that is:

$$b^t = r^t M \qquad (5)$$

The difference between b and $b$ are the error bits associated with r.

FIG. 12 shows a flow diagram of process 1200 for decoding extracted bits 1201 from a captured image in accordance with embodiments of the present invention. Process 1200 comprises components 1251 and 1253. Component 1251 obtains extracted bits 1201 (comprising K bits) associated with a captured image (corresponding to a captured array). In step 1203, n bits (where n is the order of the m-array) are randomly selected from extracted bits 1201. In step 1205, process 1200 decodes once and calculates r. In step 1207, process 1200 determines if error bits are detected for b. If step 1207 determines that there are no error bits, X,Y coordinates of the position of the captured array are determined in step 1209. With step 1211, if the X,Y coordinates satisfy the local constraint, i.e., coordinates that are within the destination area, process 1200 provides the X,Y position (such as to another process or user interface) in step 1213. Otherwise, step 1215 provides a failure indication.

If step 1207 detects error bits in b, component 1253 is executed in order to decode with error bits. Step 1217 selects another set of n bits (which differ by at least one bit from the n bits selected in step 1203) from extracted bits 1201. Steps 1221 and 1223 determine the number of iterations (loop times) that are necessary for decoding the extracted bits. Step 1225 determines the position of the captured array by testing which candidates obtained in step 1219 satisfy the local constraint. Steps 1217-1225 will be discussed in more details.

Smart Bit Selection

Step 1203 randomly selects n bits from extracted bits 1201 (having K bits), and solves for $r_1$. Using equation (5), decoded bits can be calculated. Let $I_1 = \{k \in \{1, 2, \ldots, K\} | b_k = \tilde{b}_k\}$, $\bar{I}_1 = \{k \in \{1, 2, \ldots, K\} | b_k \neq \tilde{b}_k\}$, where $\tilde{b}_k$ is the $k^{th}$ bit of $\tilde{b}$, $B_1 = \{b_k | k \in I_1\}$ and $\bar{B}_1 = \{b_k | k \in \bar{I}_1\}$, that is, $B_1$ are bits that the decoded results are the same as the original bits, and $\bar{B}_1$ are bits that the decoded results are different from the original bits, $I_1$ and $\bar{I}_1$ are the corresponding indices of these bits. It is appreciated that the same $r_1$ will be obtained when any n independent bits are selected from $B_1$. Therefore, if the next n bits are not carefully chosen, it is possible that the selected bits are a subset of $B_1$, thus resulting in the same $r_1$ being obtained.

Figure 13:
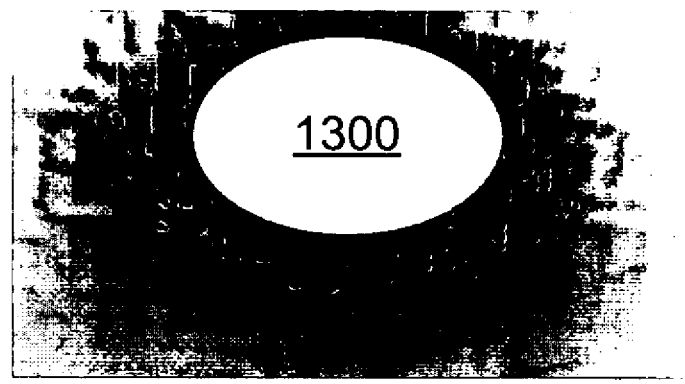
FIG. 13 shows an inverted version of an image captured from a display screen.

In order to avoid such a situation, step 1217 selects the next n bits according to the following procedure:

Choose at least one bit from $\bar{B}_1$ 1303 and the rest of the bits randomly from $B_1$ 1301 and $\bar{B}_1$ 1303, as shown in FIG. 13 corresponding to bit arrangement 1351. Process 1200 then solves $r_2$ and finds $B_2$ 1305, 1309 and $\bar{B}_2$ 1307, 1311 by computing $\tilde{b}_2^t = r_2^t M_2$. Repeat step 1. When selecting the next n bits, for every $\bar{B}_i$ (i=1, 2, 3 ..., x-1, where x is the current loop number), there is at least one bit selected from $\bar{B}_i$. The iteration terminates when no such subset of bits can be selected or when the loop times are reached.

Loop Times Calculation

With the error correction component 1253, the number of required iterations (loop times) is adjusted after each loop. The loop times is determined by the expected error rate. The expected error rate $p_e$ in which not all the selected n bits are correct is:

$$p_e = \left(1 - \frac{C_{K-n_e}^n}{C_K^n}\right)^{lt} \approx -e^{-lt\left(\frac{K-n}{K}\right)^{n_e}} \qquad (6)$$

where lt represents the loop times and is initialized by a constant, K is the number of extracted bits from the captured array, $n_e$ represents the minimum number of error bits incurred during the iteration of process 1200, n is the order of the m-array, and $C_K^n$ is the number of combinations in which n bits are selected from K bits.

In the embodiment, we want $p_e$ to be less than $e^{-5} = 0.0067$. In combination with (6), we have:

$$lt_i = \min\left(lt_{i-1}, \frac{5}{\left(\frac{K-n}{K}\right)^{n_e}} + 1\right) \qquad (7)$$

Adjusting the loop times may significantly reduce the number of iterations of process 1253 that are required for error correction.

Determine X, Y Position with Local Constraint

In steps 1209 and 1225, the decoded position should be within the destination area. The destination area is an input to the algorithm, and it may be of various sizes and places or simply the whole m-array depending on different applications. Usually it can be predicted by the application. For example, if the previous position is determined, considering the writing speed, the destination area of the current pen tip should be close to the previous position. However, if the pen is lifted, then its next position can be anywhere. Therefore, in this case, the destination area should be the whole m-array. The correct X,Y position is determined by the following steps.

In step 1224 process 1200 selects $r_i$ whose corresponding number of error bits is less than:

$$N_e = \frac{\log_{10}\left(\frac{3}{lt}\right)}{\log_{10}\left(\frac{K-n}{K}\right) \times \log_{10}\left(\frac{10}{lr}\right)} \quad (8)$$

where lt is the actual loop times and lr represents the Local Constraint Rate calculated by:

$$lr = \frac{\text{area of the destination area}}{L} \quad (9)$$

where L is the length of the m-array.

Step 1224 sorts $r_i$ in ascending order of the number of error bits. Steps 1225, 1211 and 1212 then finds the first $r_i$ in which the corresponding X,Y position is within the destination area. Steps 1225, 1211 and 1212 finally returns the X,Y position as the result (through step 1213), or an indication that the decoding procedure failed (through step 1215).

Illustrative Example of Enhanced Decoding and Error Correction Process

An illustrative example demonstrates process 1200 as performed by components 1251 and 1253. Suppose n=3, K=5, I=$(I_0 \; I_1 \ldots I_6)^t$ is the m-sequence of order n=3. Then $$A = \begin{pmatrix} I_0 & I_1 & I_2 & I_3 & I_4 & I_5 & I_6 \\ I_6 & I_0 & I_1 & I_2 & I_3 & I_4 & I_5 \\ I_5 & I_6 & I_0 & I_1 & I_2 & I_3 & I_4 \end{pmatrix} \quad (10)$$

Also suppose that the extracted bits b=$(b_0 \; b_1 \; b_2 \; b_3 \; b_4)^t$, where K=5, are actually the $s^{th}$, $(S+1)^{th}$, $(s+3)^{th}$, $(s+4)^{th}$, and $(s+6)^{th}$ bits of the m-sequence (these numbers are actually modulus of the m-array length L=$2^n-1=2^3-1=7$). Therefore $$M = \begin{pmatrix} I_0 & I_1 & I_3 & I_4 & I_6 \\ I_6 & I_0 & I_2 & I_3 & I_5 \\ I_5 & I_6 & I_1 & I_2 & I_4 \end{pmatrix} \quad (11)$$

which consists of the $0^{th}$, $1^{st}$, $3^{rd}$, $4^{th}$, and $6^{th}$, columns of A. The number s, which uniquely determines the X,Y position of $b_0$ in the m-array, can be computed after solving r=$(r_0 \; r_1 \; r_2)^t$ that are expected to fulfill $b^t=r^tM$. Due to possible error bits in b $b^t=r^tM$ may not be completely fulfilled.

Process 1200 utilizes the following procedure. Randomly select n=3 bits, say $\tilde{b}_1^t=(b_0 \; b_1 \; b_2)$, from b. Solving for $r_1$:

$$\tilde{b}_1^t = r_1^t \tilde{M}_1 \quad (12)$$

where $\tilde{M}_1$ consists of the 0th, 1st, and 2nd columns of M. (Note that $\tilde{M}_1$ is an n×n matrix and $r_1^t$ is a 1×n vector so that $\tilde{b}_1^t$ is a 1×n vector of selected bits.)

Next, decoded bits are computed:

$$\hat{b}_1^t = r_1^t M \quad (13)$$

where M is an n×K matrix and $r_1^t$ is a 1×n vector so that $\hat{b}_1^t$ is a 1×K vector. If $\hat{b}_1$ is identical to b, i.e., no error bits are detected, then step 1209 determines the X,Y position and step 1211 determines whether the decoded position is inside the destination area. If so, the decoding is successful, and step 1213 is performed. Otherwise, the decoding fails as indicated by step 1215. If $\hat{b}_1$ is different from b, then error bits in b are detected and component 1253 is performed. Step 1217 determines the set $B_1$, say $\{b_0 \; b_1 \; b_2 \; b_3\}$, where the decoded bits are the same as the original bits. Thus, $\overline{B}_1=\{b_4\}$ (corresponding to bit arrangement 1351 in FIG. 13). Loop times (lt) is initialized to a constant, e.g., 100, which may be variable depending on the application. Note that the number of error bits corresponding to $r_1$ is equal to 1. Then step 1221 updates the loop time (lt) according to equation (7), $lt_1=\min(lt,13)=13$.

Step 1217 next chooses another n=3 bits from b. If the bits all belong to $B_1$, say $\{b_0 \; b_2 \; b_3\}$, then step 1219 will determine $r_1$ again. In order to avoid such repetition, step 1217 may select, for example, one bit $\{b_4\}$ from $\overline{B}_1$, and the remaining two bits $\{b_0 \; b_1\}$ from $B_1$.

The selected three bits form $\tilde{b}_2^t=(b_0 \; b_1 \; b_4)$. Step 1219 solves for $r_2$:

$$\tilde{b}_2^t = r_2^t \tilde{M}_2 \quad (14)$$

where $\tilde{M}_2$ consists of the $0^{th}$, $1^{st}$, and $4^{th}$ columns of M.

Step 1219 computes $\hat{b}_2^t=r_2^tM$. Find the set $B_2$, e.g., $\{b_0 \; b_1 \; b_4\}$, such that $\hat{b}_2$ and b are the same. Then $\overline{B}_2=\{b_2 \; b_3\}$ (corresponding to bit arrangement 1353 in FIG. 13). Step 1221 updates the loop times (lt) according to equation (7). Note that the number of error bits associated with $r_2$ is equal to 2. Substituting into (7), $lt_2=\min(lt_1, 32)=13$.

Because another iteration needs to be performed, step 1217 chooses another n=3 bits from b. The selected bits shall not all belong to either $B_1$ or $B_2$. So step 1217 may select, for example, one bit $\{b_4\}$ from $\overline{B}_1$, one bit $\{b_2\}$ from $\overline{B}_2$, and the remaining one bit $\{b_0\}$.

The solution of r, bit selection, and loop times adjustment continues until we cannot select any new n=3 bits such that they do not all belong to any previous $B_i$'s, or the maximum loop times lt is reached.

Suppose that process 1200 calculates five $r_i$ (i=1, 2, 3, 4, 5), with the number of error bits corresponding to 1, 2, 4, 3, 2, respectively. (Actually, for this example, the number of error bits cannot exceed 2, but the illustrative example shows a larger number of error bits to illustrate the algorithm.) Step 1224 selects $r_i$'s, for example, $r_1,r_2,r_4,r_5$, whose corresponding numbers of error bits are less than $N_e$ shown in (8).

Step 1224 sorts the selected vectors $r_1,r_2,r_4,r_5$ in ascending order of their error bit numbers: $r_1,r_2,r_5,r_4$. From the sorted candidate list, steps 1225, 1211 and 1212 find the first vector r, for example, $r_5$, whose corresponding position is within the destination area. Step 1213 then outputs the corresponding position. If none of the positions is within the destination area, the decoding process fails as indicated by step 1215.

Embedded Interaction Code Enabled Surface Type Identification

Embedded Interaction Code (EIC) technology refers to a kind of data embedding and encoding technology that enables embedding both x-y position data and metadata to various surfaces, including, but not limited to, paper, a whiteboard, a display screen, and the like. A display screen may be a liquid crystal display (LCD), an organic light-emitting device (OLED), a plasma display, or the like.

LCD is a display technology that uses rod-shaped molecules (liquid crystals) that flow like liquid and bend light. Unenergized, the crystals direct light through two polarizing filters, allowing a natural background color to show. When energized, they redirect the light to be absorbed in one of the polarizers, causing the dark appearance of crossed polarizers to show.

An OLED is (also referred to as an Organic Light Emitting Diode) is a thin-film, light-emitting device that typically consists of a series of organic layers between two electrical contacts (electrodes). OLEDs can be made using small-molecular weight organic materials or polymer-based materials. Unlike LCDs and field emission displays, which are constructed of layered materials, OLtDs are monolithic devices, because each layer is deposited on the other, creating a single unit.

Plasma display (also called "gas discharge display") is a flat-screen technology that uses small cells lined with phosphor that are full of inert ionized gas (typically a mix of xenon and neon). Three cells make up one pixel (one cell has red phosphor, one green, one blue). The cells are sandwiched between x- and y-axis panels, and a cell is selected by charging the appropriate x and y electrodes. The charge causes the gas in the cell to emit ultraviolet light, which causes the phosphor to emit color. The amount of charge determines the intensity, and the combination of the different intensities of red, green and blue produce all the colors required.

A camera-equipped digital pen may be used to read EIC pattern information. Due to the different hardware implementations associated with embedding EIC-pattem information within various types of surfaces, the captured images from a particular type of surface may look significantly different than images captured from one or more other types of surfaces.

A digital pen user may switch from working on one surface to another at an arbitrary time. A straightforward way to support this scenario is to design different algorithms for different types of surfaces and let the user manually switch the digital pen's operating mode from a mode for one surface to a different mode for a different type of surface. However, a better way is to avoid requiring the user to switch the operating mode of pen manually based on the type of surface on which the pen is being used. A multi-mode algorithm, which decodes the embedded information from images captured from different types of surfaces, may be used. The multi-mode algorithm enables a single digital pen to work on both printed documents and different types of display surfaces without the user having to switch pen operating modes manually. In this way, the multi-mode algorithm advantageously provides an enhanced and more consistent user experience.

Figure 14:
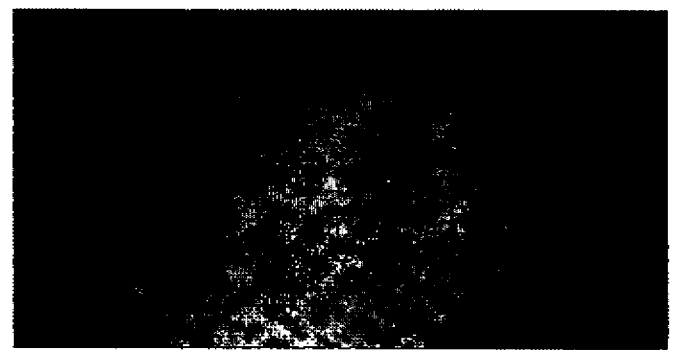
FIG. 14 shows a typical image captured from a printed EIC document.

Despite the differences in appearance between the images of FIGS. 13 and 14, the EIC pattern texture itself within both images retains some common characteristics. For example, EIC patterns in both images are formed by two groups of equally spaced parallel lines.

An embodiment of the multi-mode algorithm uses a feature from the images to determine whether a particular image was captured from a display surface or from a printed document. Based on this determination, an image is then preprocessed to get illumination-compensated images and effective EIC patterns. The type of preprocessing performed depends on whether the image was captured from a display surface or from a printed document. The preprocessing results for an image captured from a display surface and for an image captured from a printed document retain common characteristics and may, therefore, advantageously be processed by the same core decoding algorithms.

Figure 32:
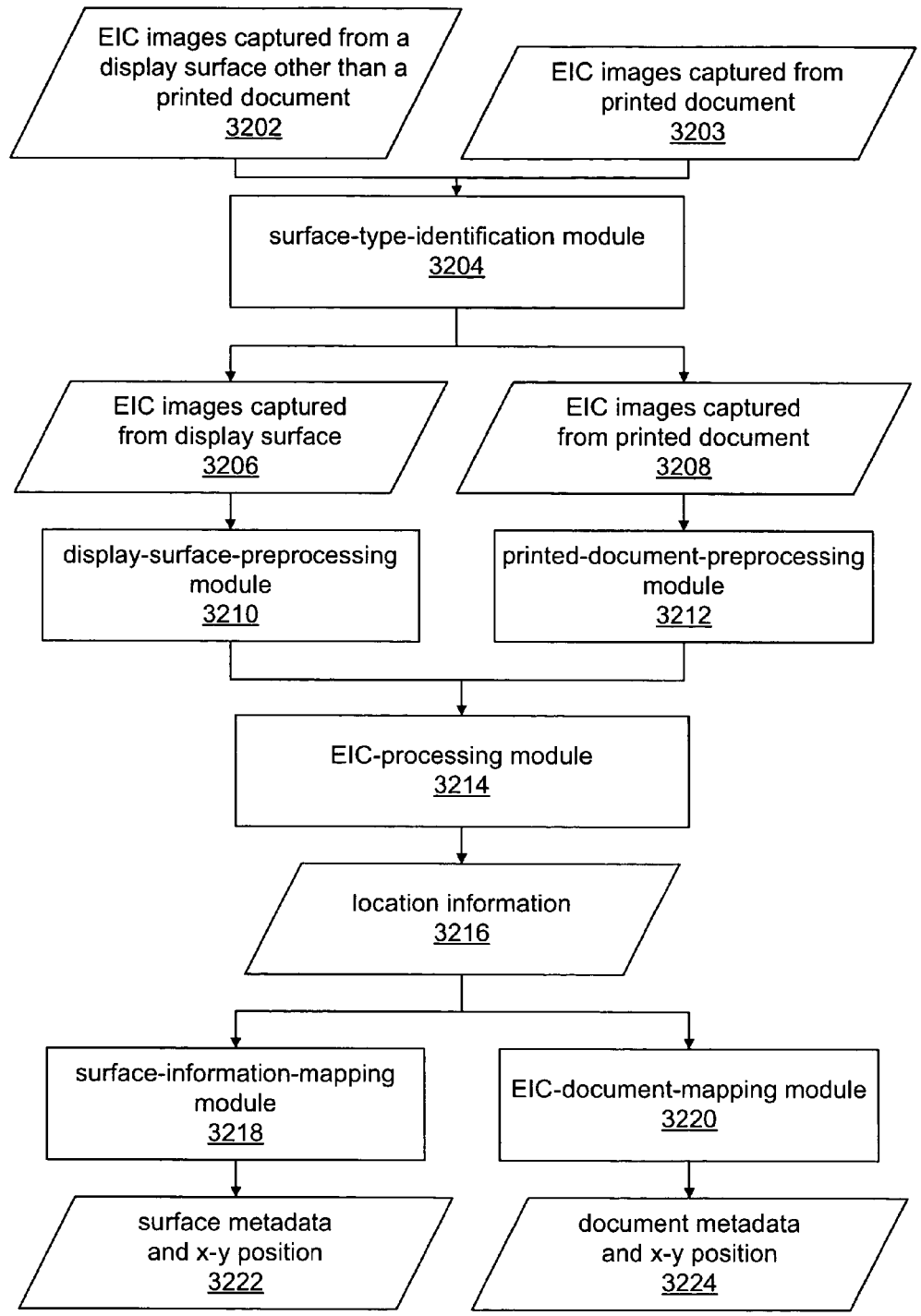
FIG. 32 shows a system, in accordance with embodiments of the invention, for processing EIC images captured from printed documents and EIC images captured from display surfaces other than a printed document.

FIG. 32 shows a system, in accordance with embodiments of the invention, for processing EIC images captured from printed documents and EIC images captured from display surfaces other than a printed document. A surface-type-identification module 3204 takes as input one or more EIC images captured from printed documents 3203 and one or more EIC images captured from a display surface other than a printed document 3202. The surface-type-identification module identifies the type of surface (i.e., printed document versus a display surface other than a printed document) from which a particular image was captured. Although EIC images captured from a display surface other than a printed document 3202 and EIC images captured from a printed document 3203 are shown separately in FIG. 32, before being processed by the surface-type-identification module 3204, the type of surface (i.e., printed document versus other than a printed document) from which a particular image was captured is unknown. On the other hand, EIC images captured from display surface 3206 have been identified by the surface-type-identification module 3204 as having been captured from a display surface other than a printed document. Similarly, EIC images captured from a printed document 3208 have been identified by the surface-type-identification module 3204 as having been captured from a printed document.

Figure 33:
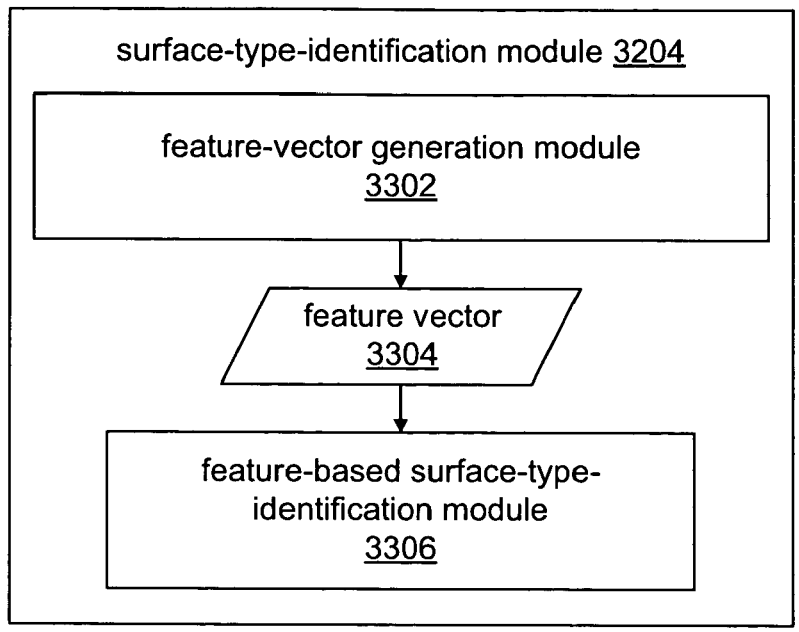
FIG. 33 shows an embodiment of the surface-type-identification module of FIG. 32.

FIG. 33 shows an embodiment of the surface-type-identification module 3204. In the embodiment of FIG. 33, a feature-vector generation module 3302 generates a feature vector 3304, which is used by a feature-based surface-type-identification module 3306.

Figure 34:
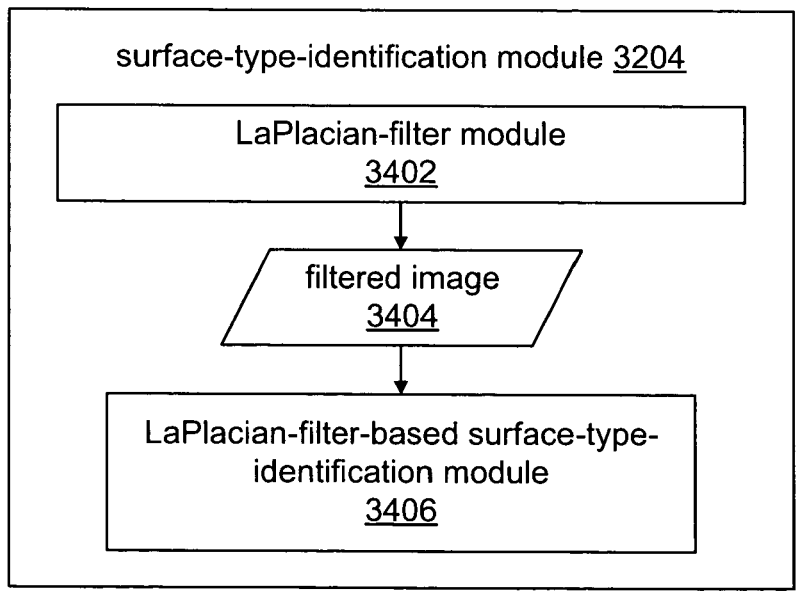
FIG. 34 shows an alternate embodiment of the surface-type-identification module of FIG. 32.

FIG. 34 shows an alternate embodiment of the surface-type-identification module 3204. In the embodiment of FIG. 34, a LaPlacian-filter module 3402 generates a filtered image 3404, which is used by a LaPlacian-fileter-based surface-type-identification module 3406.

Ways in which the surface-type-identification module 3204 may distinguish between the different types of surfaces from which images have been captured are discussed in more detail below.

A display-surface-preprocessing module 3210 preprocesses EIC images captured from display surfaces other than printed documents (as identified by the surface-type-identification module 3204). A printed-document-preprocessing module 3212 preprocesses EIC images captured from printed documents (as identified by the surface-type-identification module 3204). The preprocessing performed by the display-surface-preprocessing module 3210 and the printed-document-preprocessing module 3212 are similar to one another and are discussed in more detail below.

Preprocessed images are passed from the display-surface-preprocessing module 3210 and from the printed-document-preprocessing module 3212 to the EIC-processing module, which performs EIC pattern analysis, EIC symbol recognition, and EIC decoding, which are discussed above in more detail. Location information 3216, which is output by the EIC-processing module 3214, may be input to a surface-information-mapping module 3218 for images captured from a display surface other than a printed document or may be input to an EIC document mapping module 3220 for images captured from a printed document.

Figure 38:
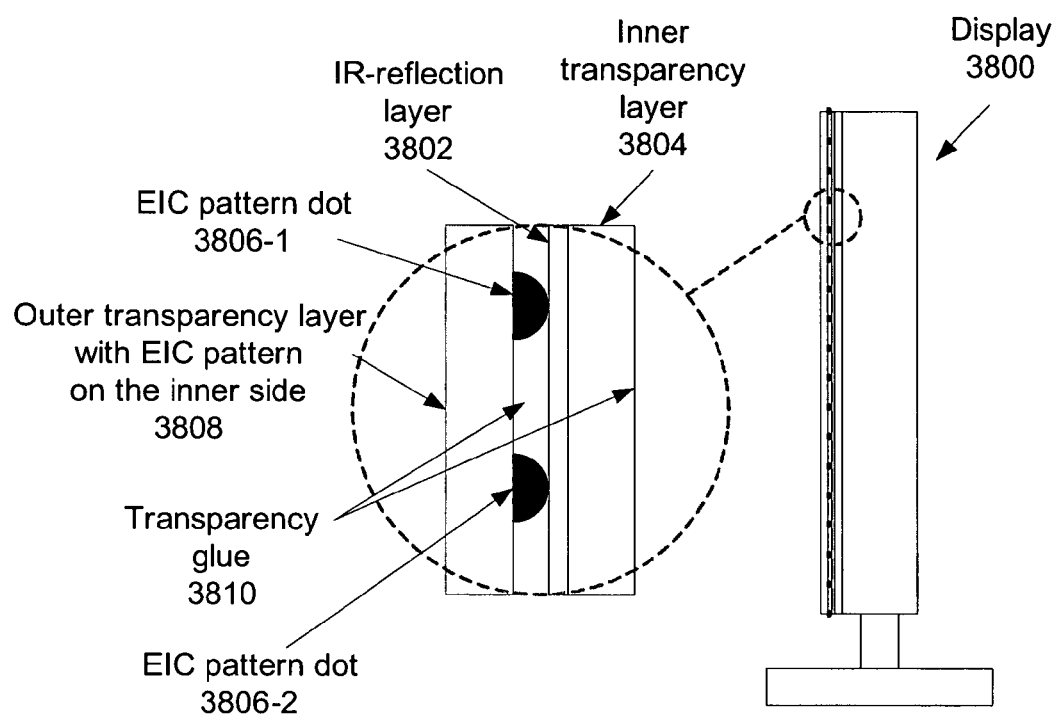
FIG. 38 shows an embedded interaction code-enabled display in accordance with embodiments of the invention.

The surface-information-mapping module 3218 outputs surface metadata and x-y position 3222. Referring to FIG. 38, in accordance with embodiments of the invention, an embedded interaction code-enabled display 3800 includes: an outer transparency layer 3808, an optional inner transparency layer 3804, an optional infrared-reflection layer 3802 between the outer transparency layer 3808 and the inner transparency layer 3804, an EIC dot pattern 3806 between the outer transparency layer 3808 and the infrared-reflection layer 3802, and, optionally, transparency glue 3810 between the outer transparency layer 3808 and the infrared-reflection layer 3802 or the inner transparency layer 3804. The outer transparency layer 3808 and the inner transparency layer 3804 may be glass, plastic, or a film. The EIC dot pattern 3806 may be printed on, or pressed onto, the inner side of the outer transparency layer 3808. The EIC dot pattern 3806 may include an encoded surface identifier that identifies the embedded interaction code-enabled display 3800. The encoded surface identifier may uniquely identify the embedded interaction code-enabled display 3800.

The EIC-document-mapping module 3220 outputs document metadata and x-y position 3224. As discussed above, to determine the location of a digital pen during interaction with one or more surfaces, images are captured by the digital pen. To recover ink strokes written with a digital pen on a printed document, an EIC system locates the position of the pen in relation to the document. To do this, X, Y position and metadata are encoded and embedded into a digital document. An m-array may be used to represent X, Y position and multiple m-arrays may be used to represent metadata. These multiple m-arrays may be encoded in EIC symbols. In each EIC symbol, one bit from each m-array may be encoded. EIC symbols in place of the bits of the m-array representing X, Y position form an EIC symbol array (visually, the tiling of EIC symbols forms an EIC pattern).

An EIC symbol array may be thought of as being a big map, covering the pages of a digital document. When a digital pen is used to write on these pages, a small segment of the EIC symbol array is captured in an image taken by the digital pen. Locating the position of the pen thus becomes finding the position of the segment (of the EIC symbol array) captured in the image within the EIC symbol array. This may be done by analyzing the obtained images.

Images may be normalized for illumination. Then, images of EIC dots, referred to as an effective EIC pattern, and images of document content are identified. An effective EIC pattern mask and a document content mask specify which regions of a normalized image are effective EIC pattern and which regions are document content.

Features of effective EIC pattern in the image are then analyzed. In accordance with embodiments of the invention, we assume a digital pen is used on a plane (such as a paper plane on which the EIC pattern is printed) and the spatial transformation from the plane to image (also assumed a plane) is a perspective transform. That is, effective EIC pattern in image should lie on grid lines that are a perspective transform of the grid lines in EIC symbol array. The perspective transform is first assumed to be an affine transform, i.e. evenly spaced parallel lines are kept evenly spaced and parallel, but perpendicular lines may not be perpendicular anymore. Rotation, scale and translation of the affine transform are estimated from analyzing effective EIC pattern in image. The perspective transform is then obtained by fitting effective EIC pattern to affine transformed grid lines. A homography matrix that describes the perspective transform from grid lines in EIC symbol array to image, $H_{Grid \to Image}$, is obtained.

Once the grid lines are determined, black dots on the grid lines are identified. Positions of the black dots help to determine which grid cells correspond to EIC symbols and which direction is the correct orientation of EIC symbols.

EIC symbols captured in image may be rotated due to pen rotation. When EIC symbols are at the correct orientation (i.e. oriented the same as EIC symbols in EIC symbol array), the segment of EIC symbols captured in image can be matched against EIC symbol array, i.e. bits extracted from EIC symbols can be matched against the m-array. Once we know which grid cells correspond to EIC symbols and the correct orientation of the symbols, the EIC symbols captured in an image are recognized. We now imagine a large enough section of EIC symbol array that encompasses the grid lines and corresponding EIC symbols of the image.

Given a particular EIC symbol design, and the identified correct orientation of EIC symbols in an image, a transformation from the section of EIC symbol array (that encompasses the grid lines and corresponding EIC symbols of the image) to grid can be obtained. From a previous step, a homography matrix describing the perspective transform from grid to image $H_{Grid \to Image}$, is known.

Thus, a homography matrix, $H_{Symbol \to Image}$, describing the transformation from can be obtained as:

$$H_{Symbol \to Image} = H_{Grid \to Image} \cdot H_{Symbol \to Grid}$$

The homography matrix $H_{Symbol \to Image}$, specifies the transformation of every point in the section of EIC symbol array encompassing the image to a point in the image coordinate system. The homography matrix $H_{Symbol \to Image}^{-1}$, specifies the transformation of every point in the image coordinate system to a point in the section of EIC symbol array encompassing the image.

From recognized EIC symbols in the section of EIC symbol array encompassing the image, EIC bits are extracted. For each m-array, a stream of bits is extracted. Any bit can be chosen as the bit whose position in m-array is decoded. In accordance with an embodiment of the invention, for convenience, we choose the top-left corner of the section of EIC symbol array encompassing the image, as the position to decode. Some of the bits are known (bits extracted from recognized symbols), and some are unknown (bits that can't be extracted or EIC symbols are not captured in image). As long as the number of extracted bits is more than the order of the m-array, decoding can be done.

EIC decoding obtains a location vector r by solving $b^t = r^t M$, where b is a vector of extracted bits, and M is a coefficient matrix obtained by cyclically shifting the m-sequence. Note that t in the equation stands for transpose. Location of extracted bits in m-sequence can be obtained from r by discrete logarithm. Position of extracted bits in m-array is then obtained based on how m-array is generated from m-sequence.

The position obtained from an m-array representing metadata is used to calculate the metadata. Metadata may be encoded using the same m-array as the one representing X, Y position, but shifted according to the value of the metadata. Therefore, positions obtained from the two m-arrays representing X, Y position and metadata, respectively, are different. The difference (or distance) between the two positions, however, is the same, and is the value of the metadata. If multiple m-arrays are used to encode global metadata such as a document ID, values of metadata from each of the multiple m-arrays may be combined to get the document ID.

The position obtained from the m-array representing X, Y position is the coordinates in EIC symbol array.

To recover ink stroke, we find the position of the pen tip in EIC symbol array. To do this, we use the concept of a "virtual pen tip," which is the image of the real pen tip on the image sensor plane. Location of virtual pen tip on the image sensor plane can be obtained through calibration. Location of virtual pen tip on the image sensor plane is position of the pen tip in the image coordinate system. Therefore, using the homography matrix $H_{Symbol \to Image}^{-1}$, we can obtain position of the pen tip in X', Y' coordinate system.

Given position of the pen tip in X'Y' coordinate system and coordinates of $C_{X', Y'}$ in EIC symbol array, position of the pen tip in EIC symbol array can be obtained by summing the two. With a series of images captured for an ink stroke, from each image successfully decoded, position of the pen tip in EIC symbol array is obtained. These positions are filtered, interpolated and smoothed to generate the ink stroke.

With the document ID, the corresponding digital document can be found. How EIC symbol array is allocated to each page of the document is known. Therefore, position of the pen tip in a document page can be obtained by subtracting position of the top-left corner of the page in EIC symbol array from position of the pen tip in EIC symbol array. Thus, the ink stroke is bound to a document page. Ink strokes written with digital pen on printed document are now recovered in the corresponding electronic document.

An embedded interaction code pattern may be embedded within the surface of a display screen. And common InkJet/LaserJet printers may be used to embed an EIC pattern on printed documents. FIG. 13 is an inverted version of an image captured from a display screen. The inverted version is shown, instead of the original image, in order to comply with Patent Office rules prohibiting the use of black shading in drawings. Also, in order to comply with this rule, an overexposed (i.e., white) area in the original captured image, which would show up as a black area in FIG. 13, has been redacted (via white oval 1300). FIG. 14 represents a typical image captured from a printed EIC document. The original captured image from the display screen and FIG. 14 look significantly different: there is an over-exposure area in the original image captured from the display screen; the gray level of the background of the original image captured from the display screen is less than the gray level of EIC-pattern pixels, and the opposite is true for the inverted image shown in FIG. 13.

A feature may be extracted from the captured images and a linear classifier may be used for making a determination with respect to the image type (i.e., the surface type from which the image was captured).

Surface Type Identification

Feature Definition

It is apparent that the gray level distribution of the image in FIG. 14 is more even than the gray level distribution of the image in FIG. 13. We define a vector $[v_x\ v_y]$ to represent this feature. The calculation of $[v_x\ v_y]$ involves two steps.

The first step is to generate horizontal and vertical projections of the image. We calculate the horizontal and vertical projection vector $P_{horizontal}$ and $P_{vertical}$ of an image I as $$P_{horizontal}[i] = \sum_{k=0}^{w-1} I(k, i) \text{ and } P_{vertical}[j] = \sum_{k=0}^{h-1} I(j, k),$$

where I(x,y) is the gray level of pixel (x,y) in the image; w and h are the width and height, respectively, of the image.

Second, determine the projection peak "width" for $[v_x\ v_y]$. We define $[v_x\ v_y]$ as the peak "width" of two types of images in the horizontal and the vertical projection vector. i.e. find $[v_x\ v_y]$ to satisfy the following equation:

$$\sum_{k=y_{center}-\frac{v_y}{2}}^{y_{center}-\frac{v_y}{2}} P_{horizontal}[k] = \mu S,$$

$$\sum_{k=x_{center}-\frac{v_x}{2}}^{x_{center}-\frac{v_x}{2}} P_{vertical}[k] = \mu S$$

Where $$S = \sum_{i=0}^{h-1} \sum_{j=0}^{w-1} I(i, j)$$

is the gray level summation of the whole image; μ is a constant value, in one implementation μ=0.75; $X_{center}$ and $y_{center}$ is the center of the vertical and horizontal projection vector, which is defined as:

$$x_{center} = \frac{\sum_{i=0}^{w-1} iP_{vertical}(i)}{\sum_{i=0}^{w-1} P_{vertical}(i)},$$

$$y_{center} = \frac{\sum_{i=0}^{h-1} iP_{horizontal}(i)}{\sum_{i=0}^{h-1} P_{horizontal}(i)}$$

Linear Classifier

Given 2×N images with known type (N should be a relatively large number, such as N>1000), N images captured from paper, the other N from a display surface. Assume $\{V_{1,i}, i=1, 2, \ldots N\}$ are the feature vectors of images captured from paper; $\{V_{2,i}, i=1, 2, \ldots N\}$ are the feature vectors of images captured from the display surface. A linear classifier, such as a Fisher linear classifier, can be used for separating the two types of vectors, i.e., an optimal weight W and a threshold δ can be calculated based on $V_{1,i}$ and $V_{2,i}$. W and δ can be used for determining the type of the captured images in real time.

For an image with unknown type, with feature vector V, it will be identified as an image captured from paper if $W^T V > \delta$, otherwise it will be identified as an image captured from a display surface.

For more information about suitable linear classifiers, see R. O. Duda and P. E. Hart, "Pattern Classification and Scene Analysis," New York: Wiley-Interscience, 1973. and b: R. A. Fisher, "The Use of Multiple Measurements in Taxonomic Problems," Annals of Eugenics, vol. 7, part II, pp. 179-188, 1936.

According to an embodiment of the invention, surface type may be determined in an alternate way that uses a Laplacian directive filter to process an image.

A suitable Laplacian operator is:

| −1 | −1 | −1 |
| --- | --- | --- |
| −1 | 8 | −1 |
| −1 | −1 | −1 |

Suppose the image I is filtered by this Laplacian operator shown above, the filtered image $I_1$ is:

$I_1(x,y)=0$ if $x=0$ or $x=w-1$ or $y=0$ or $y=h-1$, otherwise, $I_1(x,y)=-I(x-1,y-1)-I(x-1,y)-I(x-1,y+1)-I(x,y-1)+8I(x,y)-I(x,y+1)-I(x+1,y-1)-I(x+1,y)-I(x+1,y+1)$ We count two numbers $N_+$ and $N_-$ from the image $I_1$. $N_+$ is the number of positive pixels in $I_1$, and $N_-$ is the number of negative pixels in $I_1$.

For images like the inverse of FIG. 13 (i.e., for images captured from a display surface): $N_+ < N_-$; whereas, for images like FIG. 14, which are captured from a printed document: $N_+ > N_-$. Based on this information, we can determine whether the image was captured from a display surface or from a printed document.

Preprocessing of Images Captured from Display Surface

An image captured from a display surface is first reversed (i.e., gray-level values of pixels are inverted). Assume image I is reversed to I', then $I'(x,y)=255-I(x,y)$.

The reversed image is then further processed in three steps which are similar to the preprocessing algorithm for an image captured from printed paper document, which is discussed in more detail below.

Illumination Normalization

Figure 15:
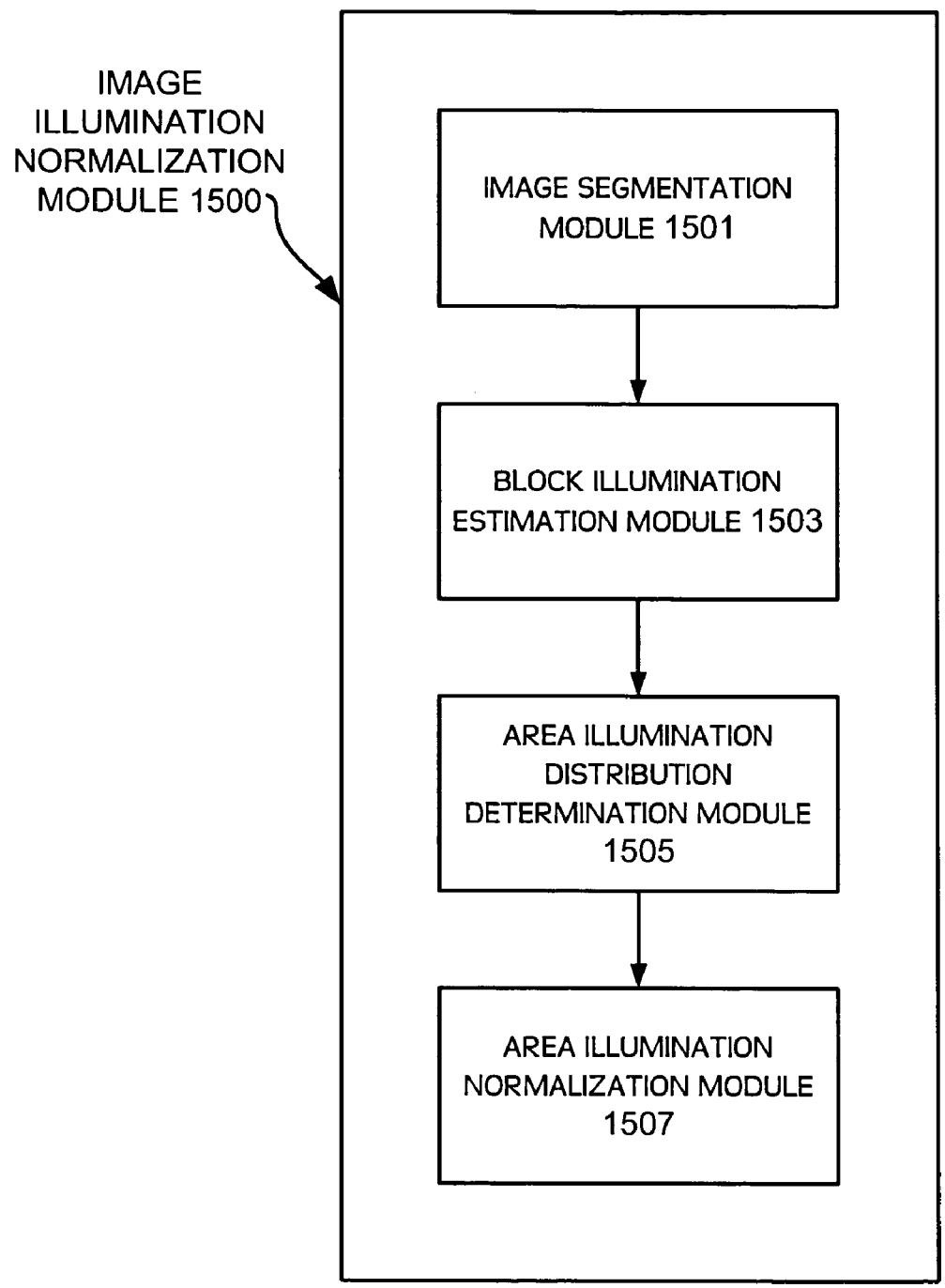
FIG. 15 illustrates an example of an image illumination normalization module that may be employed to normalize the illumination of an image according to various embodiments of the invention.

FIG. 15 illustrates an example of an image illumination normalization module 1500 in accordance with embodiments of the invention. The image illumination normalization module 1500 includes an image segmentation module 1501 that segments an image into blocks of smaller areas, such as pixels, and a block illumination estimation module 1503 that estimates the illumination of each block. The image illumination normalization module 1500 also has an area illumination distribution determination module 1505. This module performs a bilinear fitting of the illumination distribution for each area, as will be explained in more detail below. Still further, the image illumination normalization module 1500 includes an area illumination normalization module 1507, which normalizes the illumination of each area in the image. The operation of each of these modules will be discussed in greater detail with reference FIGS. 16A-25.

Figure 16A:
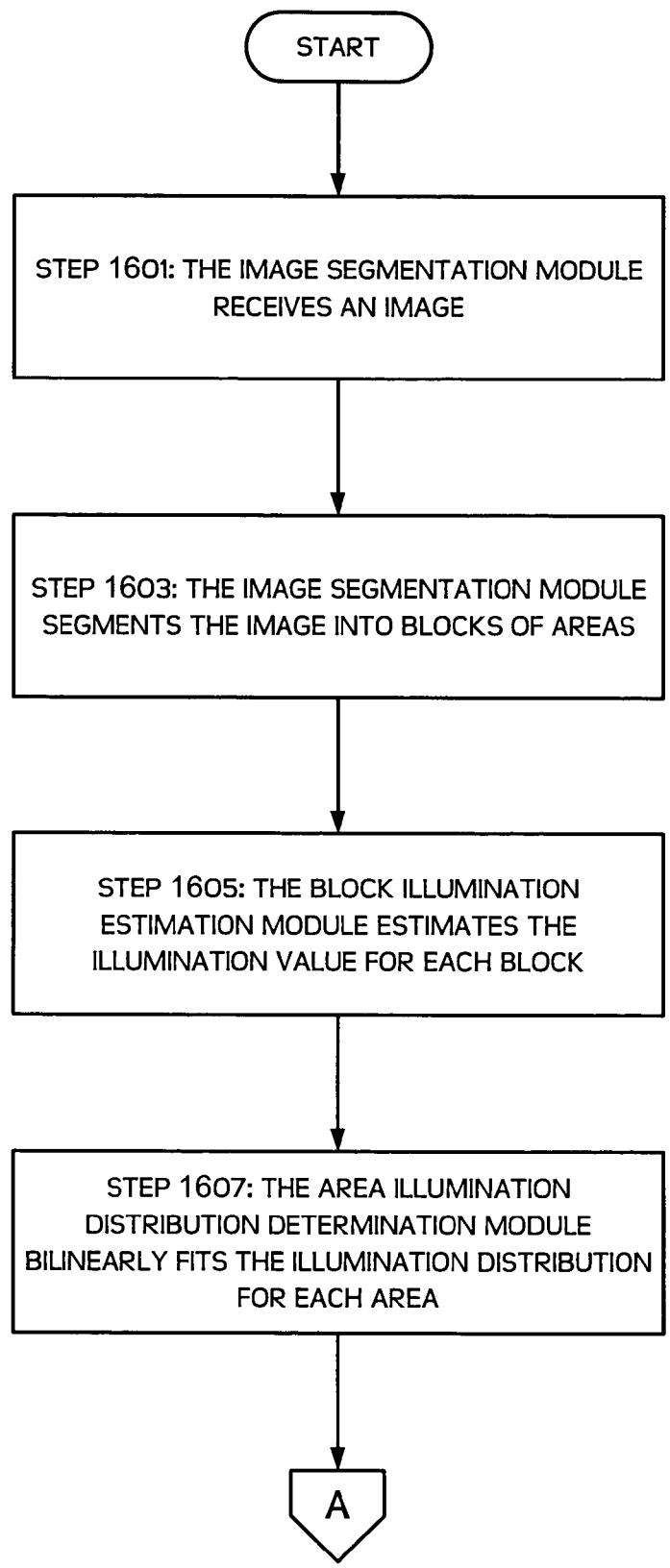
FIGS. 16A and 16B illustrate a flowchart describing the operation of the image illumination normalization module illustrated in FIG. 15.
Figure 16B:
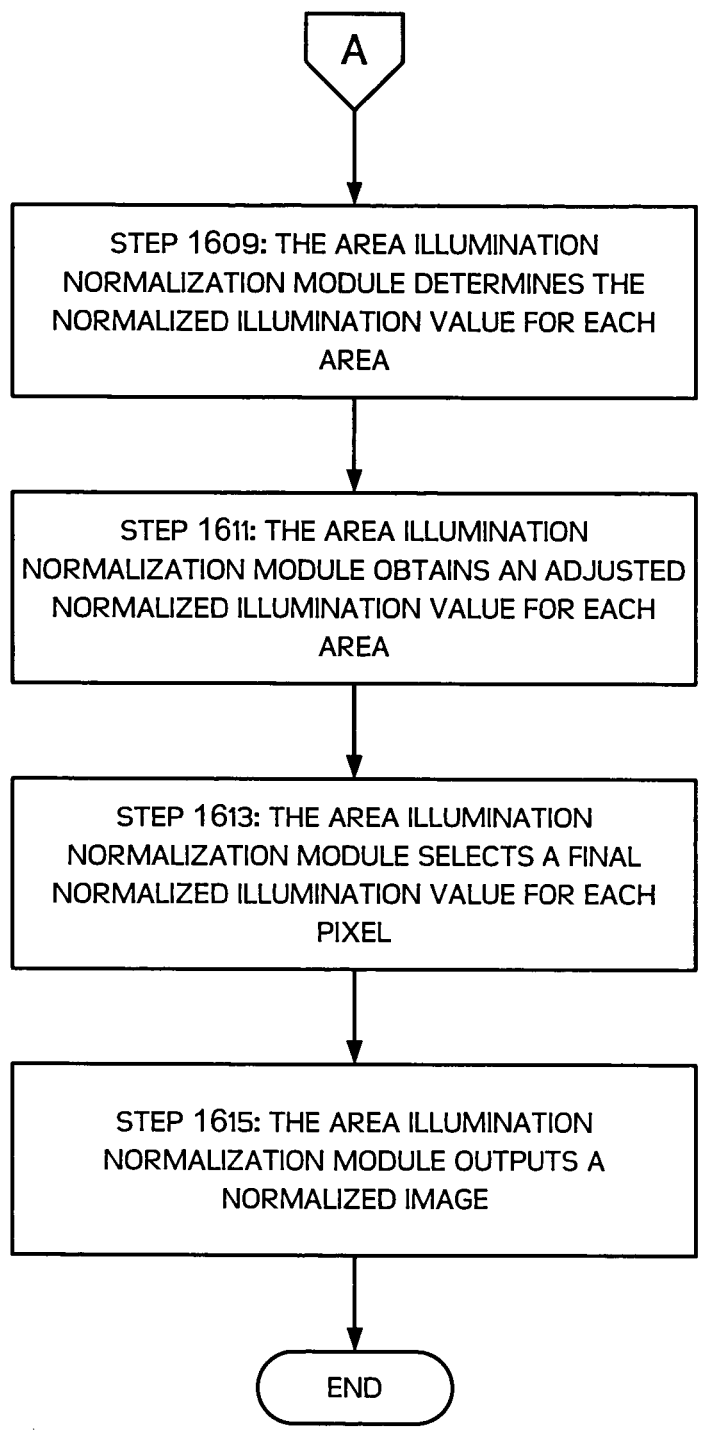
Figure 17:
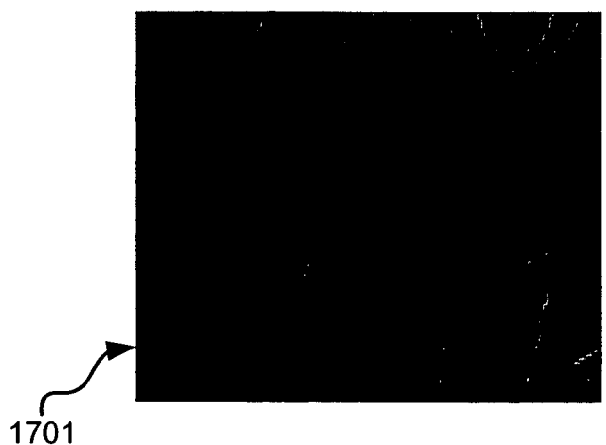
FIG. 17 illustrates an example of an image that might be processed by the image illumination normalization module illustrated in FIG. 15.

Turning now to FIG. 16A, in step 1601 the image segmentation module 1501 receives an image from the camera/pen device. FIG. 17 illustrates one example of a raw image 1701 that might be received from the camera/pen device. As seen in this figure, the image 1701 has regions that are relatively dark and regions that are relatively light, making it difficult to distinguish features in the image. In the illustrated embodiment, the image is 100×128 pixels (i.e., 100 pixels in the vertical direction and 128 pixels in the horizontal direction). It should be appreciated, however, that the image size will be determined by the camera employed by the camera/pen device 101, and various embodiments of the invention may be employed with images of any size.

Next, in step 1603, the image segmentation module 1501 segments the image 1701 into blocks of areas. In the illustrated example, the image illumination normalization module 1500 uses pixels as the areas upon which operations are performed. It should be appreciated, however, that alternate embodiments of the invention may use other units for the area. For example, with larger images, some embodiments of the invention may use groups of four adjacent pixels as the areas upon which operations are performed, while still other embodiments of the invention may use groups of six, eight, nine, sixteen, or any other number of pixels as the areas upon which operations are performed.

Figure 18:
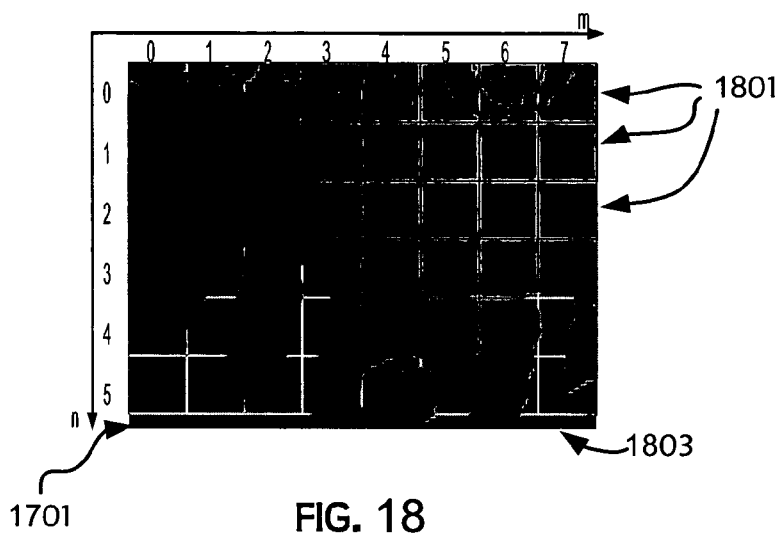
FIG. 18 illustrates the segmentation of the image into blocks starting from the top of the image.

More particularly, the image segmentation module 1501 segments the image into blocks starting from the top of the image 1701, as shown in FIG. 18. The blocks 1801 may conveniently be identified hereafter by coordinate values on indices m, n, as shown in this figure. In the illustrated embodiment, image segmentation module 1501 segments the image 1701 into blocks 1801 of 16 pixels by 16 pixels. It should be appreciated, however, that alternate embodiments of the invention may form the blocks from smaller or larger groups of pixels as desired.

Figure 19:
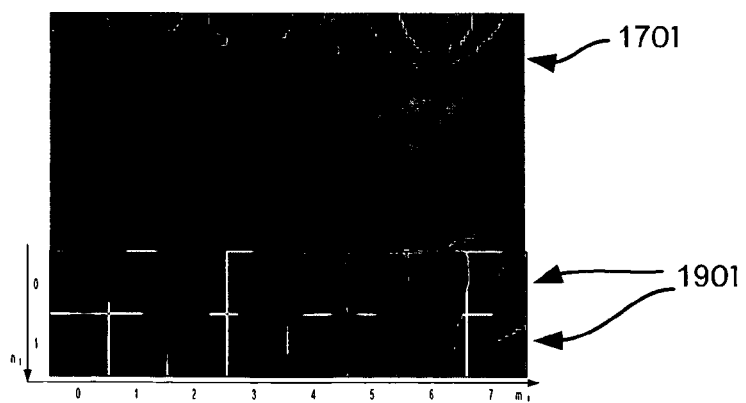
FIG. 19 illustrates the segmentation of the image into blocks starting from the bottom of the image.

Because the image 1701 in the illustrated example has a height of 100 pixels and the blocks 1801 are formed from 16×16 groups of pixels, there is a small region 1803 at the bottom of the image 1701 in which the pixels are not segmented into blocks 1801. As will be apparent from the detailed explanation provided below, this discrepancy may skew the accuracy of the illumination normalization process. Accordingly, as shown in FIG. 19, the image segmentation module 1501 forms a second segment of blocks 1901 starting from the bottom of the image 1701. The blocks 1901 may conveniently be identified hereafter by coordinate values on indices $m_1$, $n_1$, as shown in FIG. 19. As with blocks 1801, the blocks 1901 are formed from 16×16 groups of pixels.

Next, in step 1605, the block illumination estimation module 1503 estimates the illumination value for each block 1801 and 1901. That is, the block illumination estimation module 1503 estimates an overall representative illumination value for each block 1801 and 1901 based upon the illumination value of each individual pixel making up the block. The image 1701 is a black-and-white image, so the illumination value for each pixel is a gray level value. In the illustrated example, the block illumination estimation module 1503 estimates the illumination value of a block 1801 or 1901 by creating a histogram of the number of pixels in the block at each gray-level.

Figure 20:
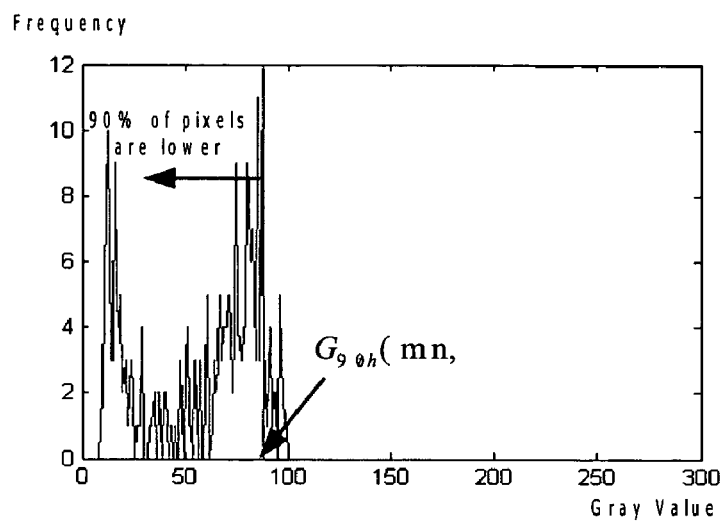
FIG. 20 illustrates one example of a type of histogram that might be employed by various embodiments of the invention to estimate the illumination of a block.

FIG. 20 illustrates one example of a type of histogram that might be employed by various embodiments of the invention to estimate the illumination of a block 1801 or 1901. As seen in this figure, the X-axis corresponds to the gray levels of the pixels making up the block. The Y-axis then corresponds to the number of pixels that have the gray-level. Using this histogram, the block illumination estimation module 1503 estimates a representative illumination value for the block. In the illustrated example, the block illumination estimation module 1503 identifies the $90^{th}$ percentile illumination value to be the estimated illumination value of the block. That is, the block illumination estimation module 1503 identifies the gray level $G_{90th}$ at which 90% of the pixels in the block are darter than $G_{90th}$, and employs this value as the illumination value of the block. Of course, other embodiments of the invention may employ alternate percentile criteria for estimating the illumination value of a block as desired. Still further, some embodiments of the invention may employ alternate techniques for determining the overall illumination of each block.

It also should be appreciated that, while the illustrated example relates to a black-and-white image, various embodiments of the invention may be used to process color images. With these embodiments, the block illumination estimation module 1503 may operate based upon the brightness level of each pixel in the image.

After the block illumination estimation module 1503 has estimated the illumination value for each block 1801 and 1901, the area illumination distribution determination module 1505 performs a bilinear fitting of the illumination distribution for each area in step 1607. That is, the area illumination distribution determination module 1505 determines an illumination distribution value for an area by averaging the estimated illumination values of the blocks surrounding the area. In the illustrated embodiment, the area illumination distribution determination module 1505 averages the estimated illumination values of the four blocks surrounding the area, but other embodiments of the invention may average the estimated illumination values of other groups of blocks surrounding the area.

As previously noted, there is a region 1803 at the bottom of image 1701 that has not been segmented into any of the blocks 1801. Accordingly, an average illumination value of the surrounding blocks would not accurately relate to the illumination values of these unsegmented areas. The illumination distribution values for the pixels in these regions thus are determined using the blocks 1901 rather than the blocks 1801. Accordingly, the illumination distribution values are determined in a two-step process. The pixels that are primarily within blocks 1801 (i.e., the pixels having a y coordinate value of 0-87 are determined using the estimated illumination values of the blocks 1801, while the pixels that are primarily within blocks 1901 (i.e., the pixels having a y coordinate value of 88-99) are determined using the estimated illumination values of the blocks 1901.

With the illustrated embodiment, for each pixel (x,y), where y=0, 1, . . . 87, the illumination distribution value of that pixel D(x,y) is estimated as:

$$D(x,y)=(1-\eta_y)\cdot[(1-\eta_x)\cdot I_{B(m,n)}+\eta_x\cdot I_{B(m+1,n)}]+\eta_y\cdot[(1-\eta_x)\cdot I_{B(m,n+1)}+\eta_x\cdot I_{B(m+1,n+1)}]$$

where $I_{B(m,n)}=G_{90th}(m,n)$, s is the size of a block (in the illustrated example, s=16), $$m = \min\left(\max\left[int\left(\frac{x-s/2}{s}\right), 0\right], 6\right),$$

$$n = \min\left(\max\left[int\left(\frac{y-s/2}{s}\right), 0\right], 4\right),$$

$$x_1 = ms + \frac{s}{2},$$

$$x_2 = (m+1)s + \frac{s}{2},$$

$$y_1 = ns + \frac{s}{2},$$

$$y_2 = (n+1)s + \frac{s}{2},$$

$$\eta_x = \frac{x-x_1}{x_2-x_1},$$

and $$\eta_y = \frac{y-y_1}{y_2-y_1}.$$

It should be noted that int(x) is a function that returns the largest integer less than or equal to x. For example, int(1.8)=1, int(−1.8)=−2.

Figure 21:
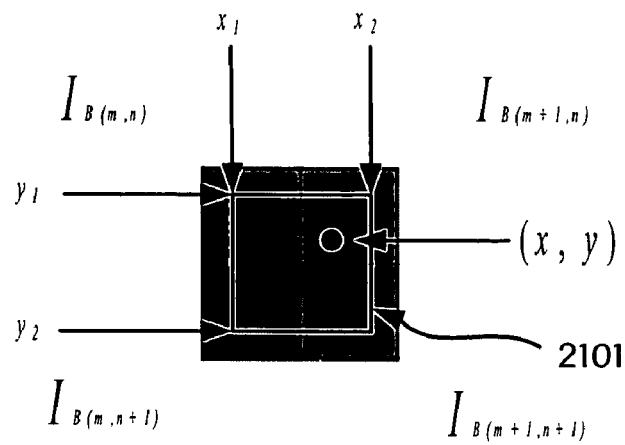
FIG. 21 illustrates the illumination value information obtained using the operation described in FIGS. 16A and 16B.
Figure 22:
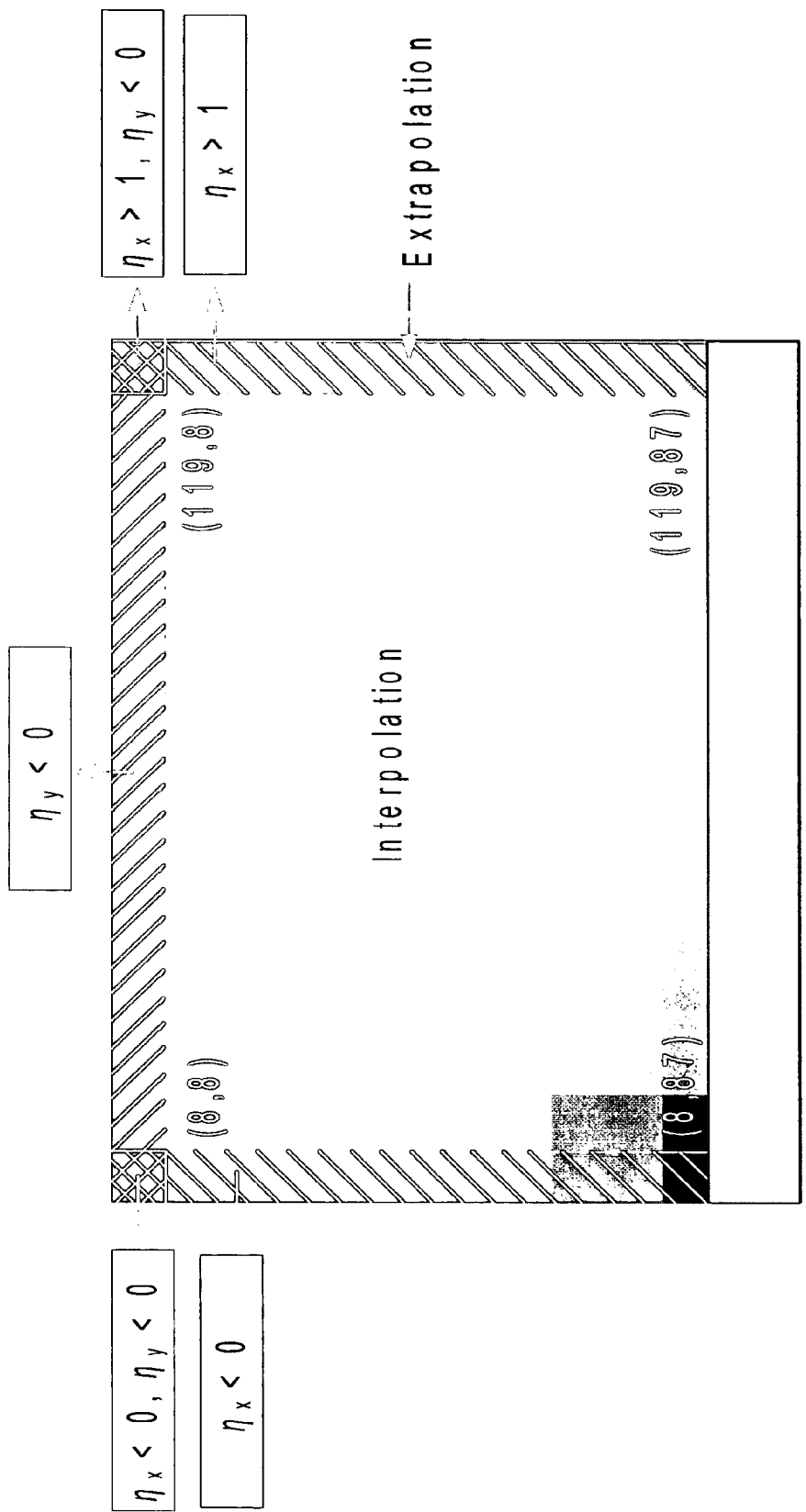
FIGS. 22 and 23 illustrate the different regions for which interpolation is used to determine the illumination value information according to various embodiments of the invention.
Figure 23:
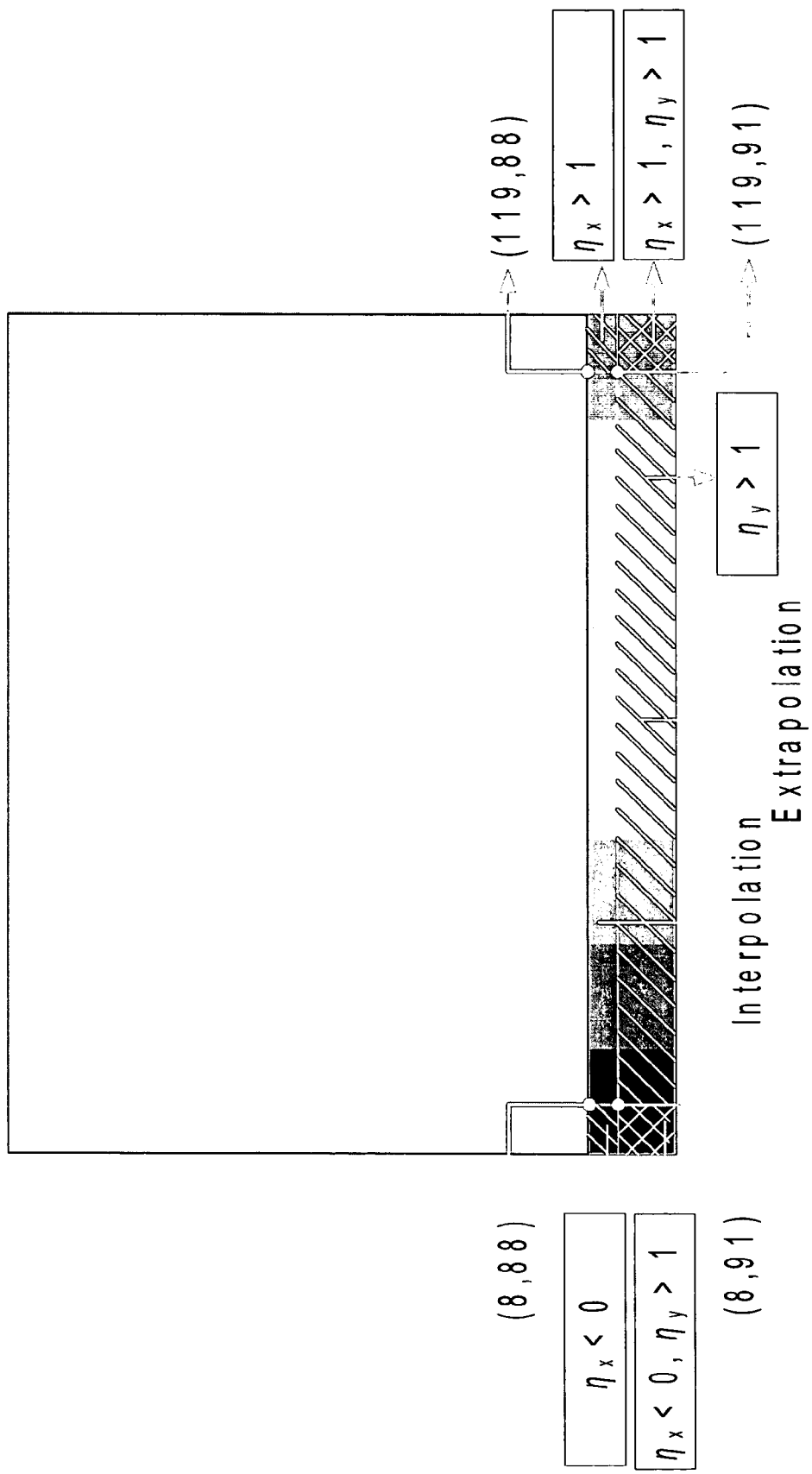
Figure 24:
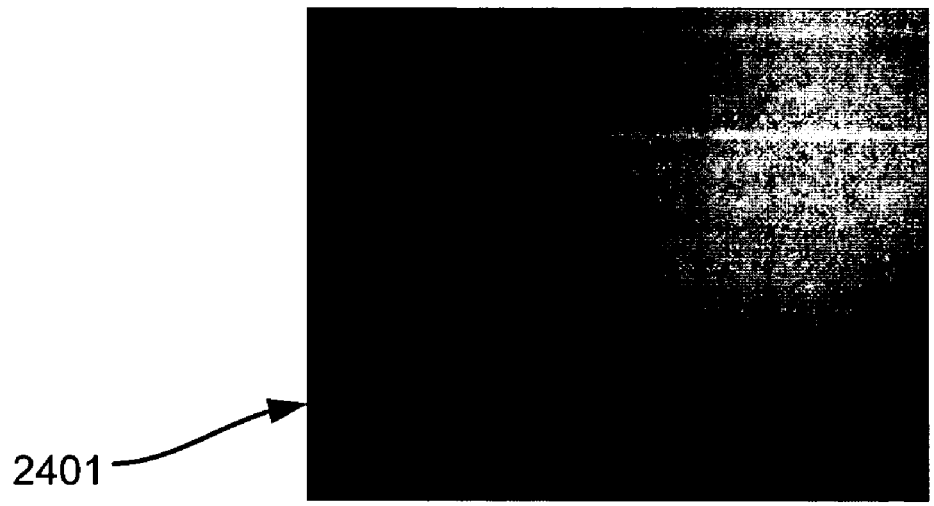
FIGS. 24 illustrates the illumination distribution values obtained for the image shown in FIG. 6 using the operation described in FIGS. 16A and 16B.

The illumination value information employed to determine the illumination distribution value of a pixel using this process is graphically illustrated in FIG. 21. As will be appreciated from this image, some pixels will fall outside of any region 2101 that can be equally distributed among four adjacent blocks 1801. For example, in the illustrated example, pixels having an x coordinate value of 0-7 or 120-127 and pixels having a y coordinate value of 0-7 will fall outside of any region 2101 that can be equally distributed among four adjacent blocks 1801. For these pixels in border regions, the above equations may still be applied to determine their illumination distribution values, except that extrapolation will be used instead of interpolation. The different regions are graphically illustrated in FIG. 22.

Similarly, for each pixel (x,y), where y=88, 89, . . . 99, the illumination distribution value of that pixel D(x,y) is estimated as:

$$D(x,y)=(1-\eta_y)\cdot[(1-\eta_x)\cdot I_{B(m_1,n_1)}+\eta_x\cdot I_{B(m_1+1,n_1)}]+\eta_y\cdot[(1-\eta_x)\cdot I_{B(m_1,n_1+1)}+\eta_x\cdot I_{B(m_1+1,n_1+1)}]$$

where $I_{B(m_1,n_1)}=G_{90\ th}(m_1,n_1)$ s is the size of a block (in one implementation, s=16), $$m_1 = \min\left(\max\left[int\left(\frac{x-s/2}{s}\right), 0\right], 6\right),$$

$$n_1 = 0,$$

$$x_1 = m_1 s + \frac{s}{2},$$

$$x_2 = (m_1+1)s + \frac{s}{2},$$

$$y_1 = \text{height} - s - \frac{s}{2} - 1,$$

$$y_2 = \text{height} - \frac{s}{2} - 1,$$

$$\eta_x = \frac{x-x_1}{x_2-x_1},$$

and $$\eta_y = \frac{y-y_1}{y_2-y_1}.$$

height is the height of the image sensor. In the illustrated example, height=100.

Again, some pixels will fall along the image border outside of any region that can be equally distributed among four adjacent blocks 1901. For these pixels in border regions, the above equations may still be applied to determine their illumination distribution values, except that extrapolation will be used instead of interpolation. The different regions are graphically illustrated in FIG. 23. The illumination distribution values 2401 for the entire image 1701 are then shown in FIG. 24.

Once the area illumination distribution determination module 1505 has determined the illumination distribution value for each area, the area illumination normalization module 1507 determines the normalized illumination value for each area in step 1609. More particularly, the area illumination normalization module 1507 determines the normalized illumination value for each area by dividing the area's original illumination value for the illumination distribution value for that area. Next, in step 1611, the area illumination normalization module 1507 obtains an adjusted normalized illumination value for each area by multiplying the normalized illumination value for each area by a uniform illumination level $G_0$. In the illustrated example, the value of uniform illumination level $G_0$ is 200, but alternate embodiments of the invention may employ different values for the uniform illumination level $G_0$. The uniform illumination level $G_0$ represents the supposed gray level of the captured image in a blank area for an ideal case (i.e., uniform illumination with an ideal image sensor). Thus, in an ideal case, the gray level of all pixels of a captured image from a blank area should be equal to the uniform illumination level $G_0$.

Figure 25:
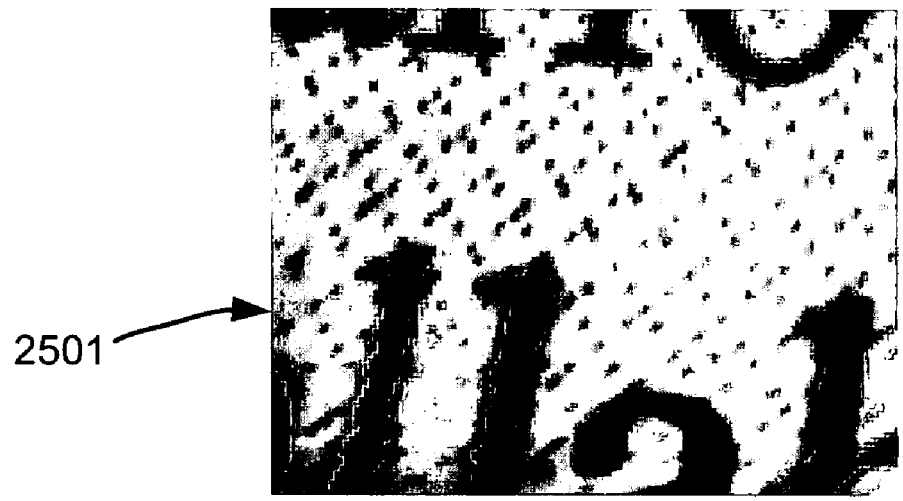
FIG. 25 illustrates how the image shown in FIG. 6 appears after being processed using the operation described in FIGS. 16A and 16B.

Lastly in step 1613, the area illumination normalization module 1507 selects a final normalized illumination value for each pixel by assigning each pixel a new illumination value that is the lesser of its adjusted normalized illumination value and the maximum illumination value. Thus, with the illustrated example, the final normalized illumination value for each pixel is determined as a gray level G(x,y) where:

$$G(x, y) = \min\left(G_0 \cdot \frac{G(x, y)}{D(x, y)}, 255\right)$$

where $G_0=200$ and 255 is the maximum gray level (i.e., white). Then, in step 515, area illumination normalization module 1507 outputs a normalized image using the final normalized illumination value for each pixel. FIG. 25 illustrates how the image 1701 appears as image 2501 after being processed in the manner described in detail above.

As is apparent from FIG. 13 and the comments above regarding FIG. 13, there are no EIC patterns visible in the over-exposure area of the image. After the original captured image has been reversed, the overexposure area is changed to a darker area, which is covered with a white oval in FIG. 14 to comply with Patent Office rules that prohibit black shading in drawings. Separating this area in FIG. 13 is similar to the separation of the document's content area in the images captured from a printed document. An implementation uses an overexposure-area-separation algorithm to separate the overexposed area from the areas where the EIC pattern is visible. The overexposure-area-separation algorithm is substantially the same as the following document-content-separation algorithm used for separating document content from areas where the EIC pattern is visible in images captured from a printed document. Similarly, an implementation uses an EIC-pattern-separation algorithm to separate effective EIC-pattern pixels from the rest of a captured image. The EIC-pattern-separation algorithm is substantially the same as the following algorithm used for separating EIC-pattern pixels from other areas in images captured from a printed document.

Pattern Determination

Figure 26:
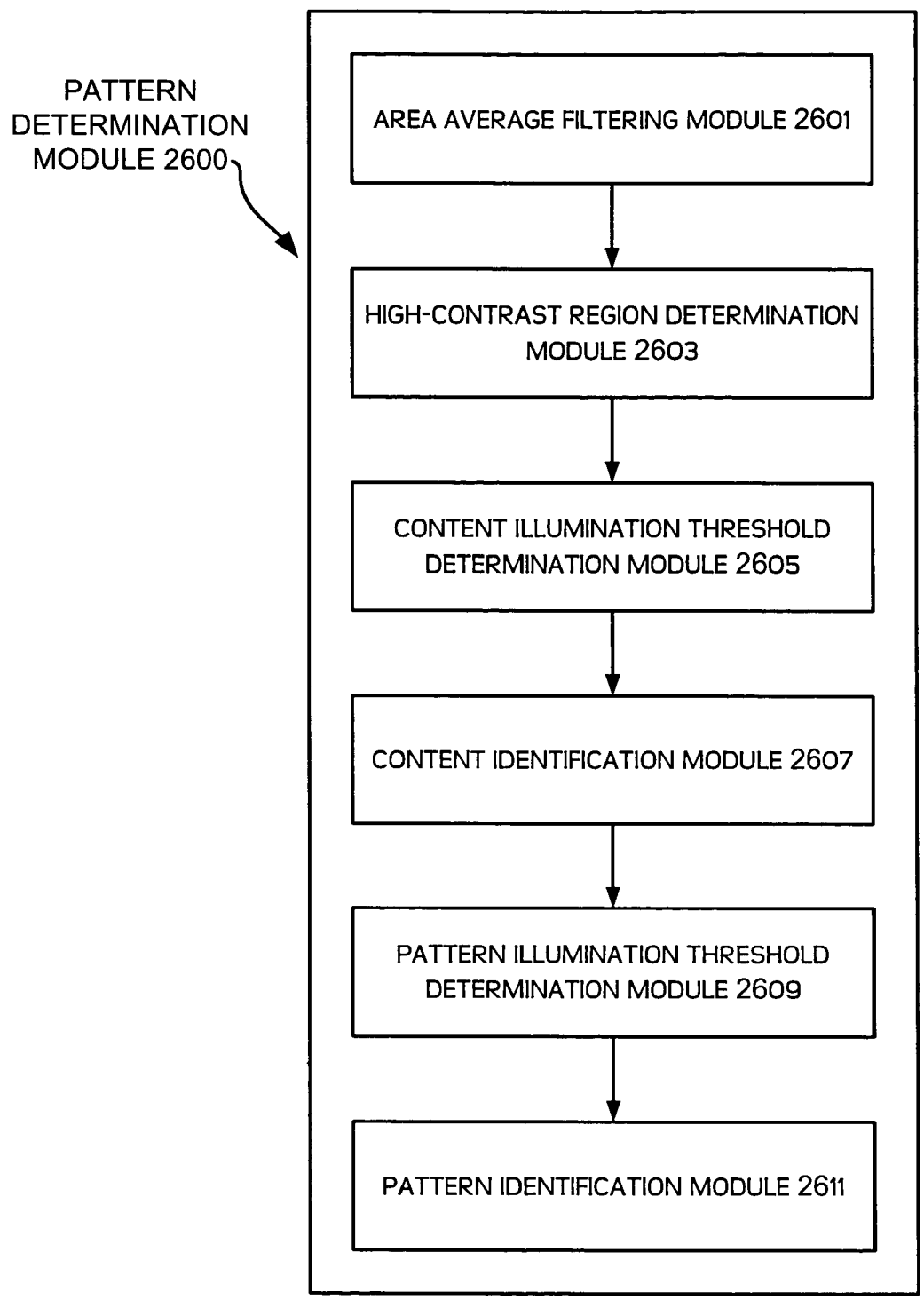
FIG. 26 illustrates a pattern determination system for distinguishing a location pattern from content in a document image according to various embodiments of the invention.
Figure 27A:
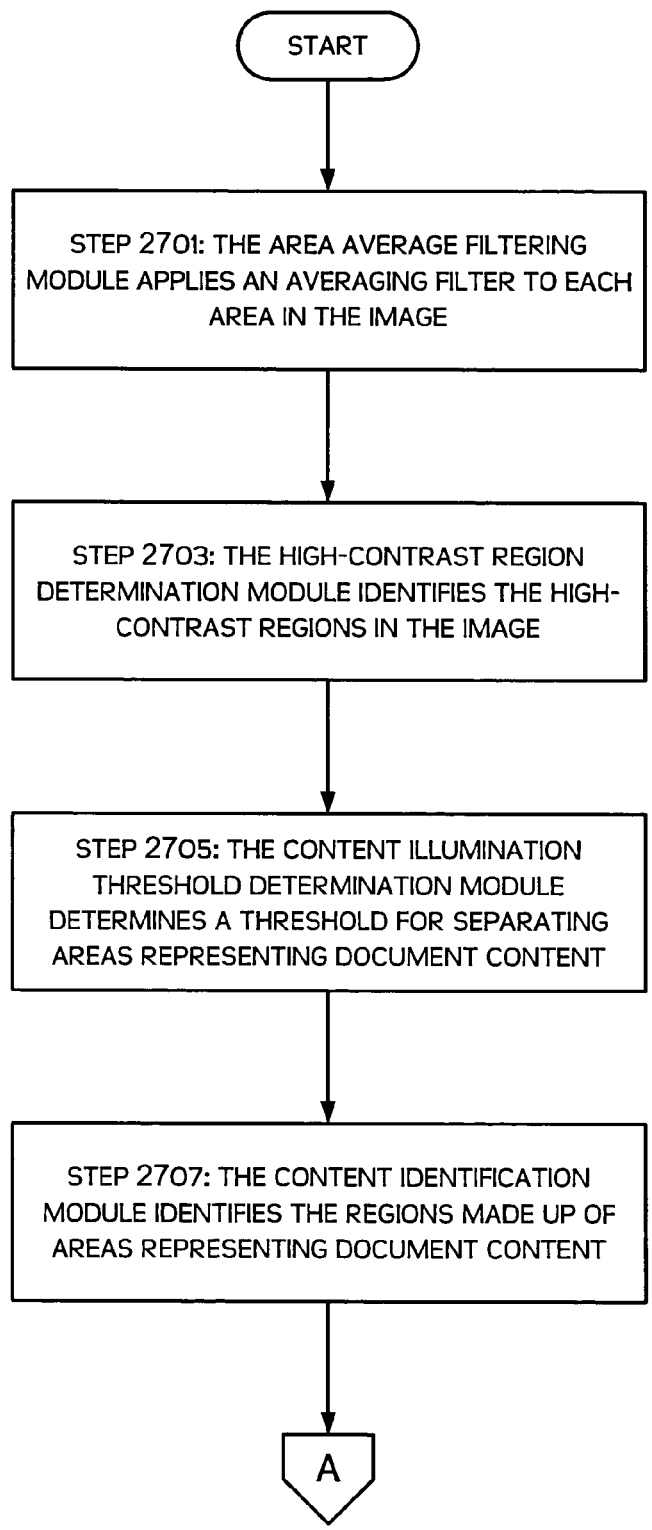
FIGS. 27A and 27B illustrate a flowchart describing the operation of the pattern determination system illustrated in FIG. 26.
Figure 27B:
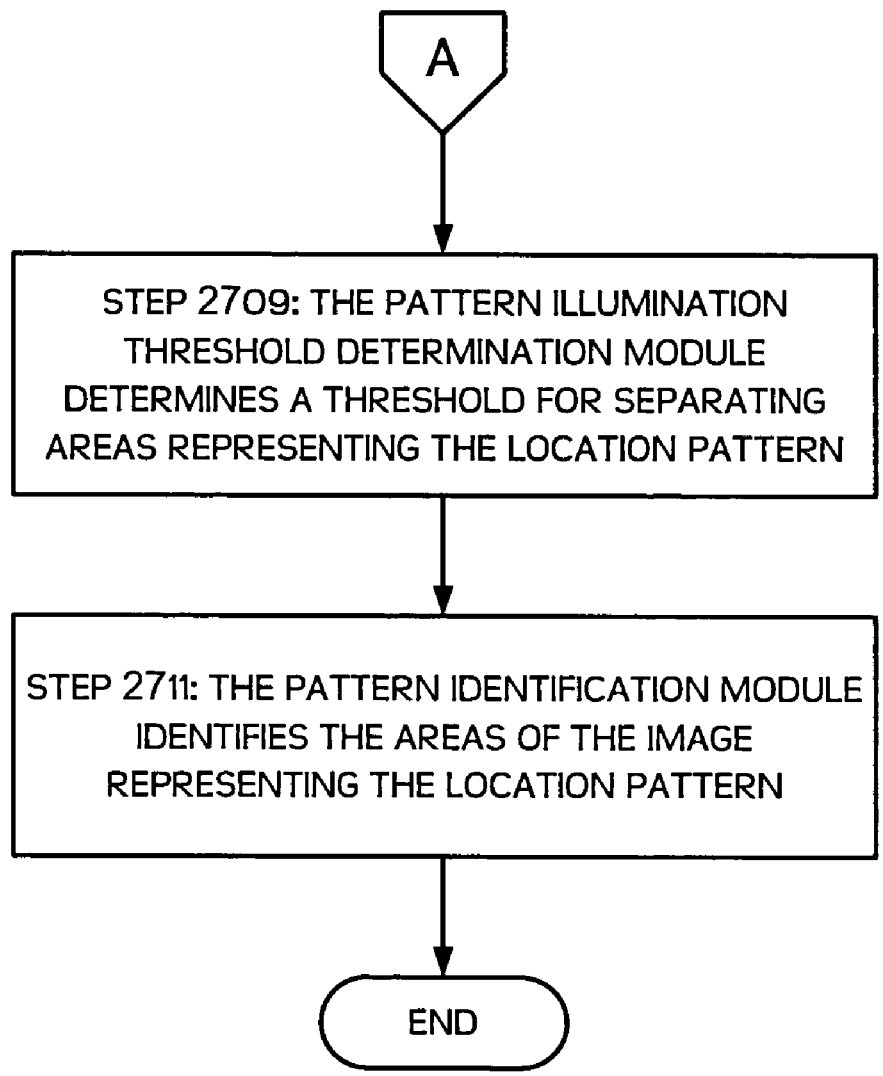

After the image illumination normalization module 1500 normalizes the image captured by the pen/camera device, the pattern determination module 2600 distinguishes the areas of the normalized image that represent content in a document from the areas of the normalized image that represent the location (also referred to as the EIC) pattern. FIG. 26 illustrates a pattern determination system for distinguishing a location pattern from content in a document image. As seen in this figure, the pattern determination module 2600 includes an area average filtering module 2601 and a high-contrast region determination module 2603. As will be discussed in greater detail below, the area average filtering module 2601 applies an averaging filter to the illumination value of each area in the image. The high-contrast region determination module 2603 then identifies high-contrast regions in the image.

The pattern determination module 2600 also includes a content illumination threshold determination module 2605, a content identification module 2607, a pattern illumination threshold determination module 2609, and a pattern identification module 2611. As will be discussed in greater detail below, the content illumination threshold determination module 2605 determines a first illumination value threshold that the content identification module 2607 then uses to identify areas of the image representing content. Similarly, the pattern illumination threshold determination module 2609 determines a second illumination value threshold that the pattern identification module 2611 uses to identify areas of the image that represent a location pattern.

The pattern determination module 2600 takes advantage of the fact that, in an image of a document containing both content (e.g., printed text, pictures, etc.) and a location pattern, the location pattern, document content and document background tend to have different brightness levels. Thus, with a black-and-white image, the areas representing the location pattern, document content and document background will typically have different gray levels, with the areas representing the document content being the darkest, the areas representing the location pattern being the second darkest, and the areas representing the document background being the least dark. Thus, the pattern determination module 2600 can distinguish the three different areas by thresholding.

In order to more efficiently determine the appropriate thresholds to separate the three brightness levels, the pattern determination module 2600 first identifies high-contrast regions. For black-and-white images, these are regions that have a relatively large difference in gray levels between adjacent image areas (e.g., such as pixels). Thus, the threshold for segmenting the areas representing document content from other areas in the image can be more effectively identified in the high-contrast areas. Once the threshold is found, regions that are darker than the threshold are identified as representing document content. These regions can then be marked as being made up of areas representing content. For example, the areas in a content region may be assigned a value of 1 in a document content mask.

After the regions representing document content have been identified, the brightness values of the remaining areas can then be analyzed. Those regions having an illumination value above a second threshold are then identified as representing the location pattern. These regions can then be marked as being made up of areas representing the location pattern. For example, the areas in a pattern region may be assigned a value of 1 in a location pattern mask. Thus distinguished from the rest of the image, the areas representing the location pattern can then be more accurately analyzed.

The operation of the pattern determination module 2600 will now be described with reference to FIGS. 27A-31. More particularly, the operation of the pattern determination module 2600 will be discussed as applied to the normalized image 2501. Thus, in this example, the image is a black-and-white image. It should be appreciated, however, that various embodiments of the invention may be employed to process color images. As previously noted with respect to the image illumination normalization module 1500, if the image is a color image, then the pattern determination module 1500 will operate using brightness levels rather than gray levels. Also, the illustrated example of the pattern determination module 2600 uses pixels as the area unit on which it performs operations. It should be noted, however, that other examples of the invention may operate on other areas, such as groups of multiple pixels, as previously described with respect to the image illumination normalization module 1500.

Initially, high contrast areas are identified to more efficiently locate regions that represent content, as previously noted. Because regions containing the location pattern may also have a large difference illumination levels, however, the image areas are first filtered to reduce the illumination value difference in the regions surrounding the location pattern. More particularly, in step 2701, the area average filtering module 2601 applies an averaging filter to each area in the image. For black-and-white images, this filtering operation replaces the gray level of each pixel by an average of the gray levels of the surrounding eight pixels and the gray level of the pixel itself. That is, for every pixel (x,y)

$$G_{average}(x, y) = \frac{1}{9}\sum_{i=-1}^{1} \sum_{j=-1}^{1} G(x+i, y+j)$$

where G(x,y) is the gray level of pixel (x,y). It should be note that G(x,y) is the illumination-normalized gray level.

Next, in step 2703, the high-contrast region determination module 2603 identifies the high-contrast regions in the image using the averaged illumination level of each pixel. In particular, for each pixel, the high-contrast region determination module 2603 identifies the maximum and the minimum averaged gray level values in the 17×17 pixel neighborhood surrounding the pixel. That is, for every pixel (x,y), $$G_{max}(x,y) = \max(G_{average}(p,q) | \max(x-8, 0) \leq p \leq \min(x+8, 127), \max(y-8, 0) \leq q \leq \min(y+8, 127))$$

$$G_{min}(x,y) = \min(G_{average}(p,q) | \max(x-8, 0) \leq p \leq \min(x+8, 127), \max(y-8, 0) \leq q \leq \min(y+8, 127))$$

Figure 28:
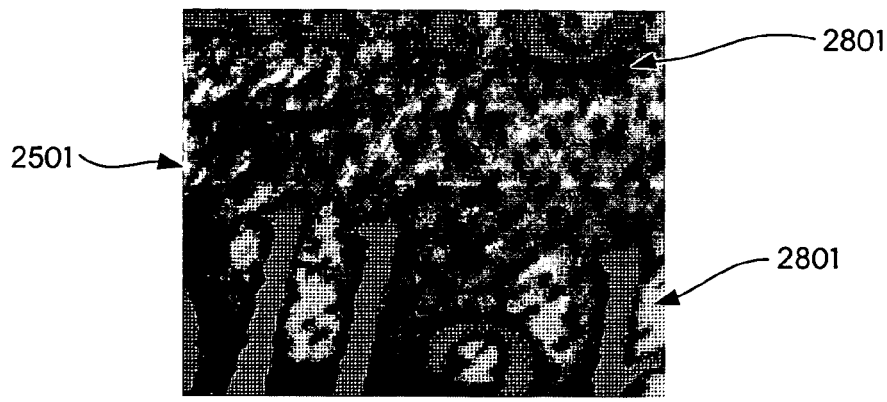
FIG. 28 illustrates the high-contrast areas identified using the operation described in FIGS. 27A and 27B.

It should be appreciated that the determination described above is based upon the specific number of pixels of the image used in the illustrated example. A similar determination, using different pixels coordinate values, would be employed for embodiments of the invention used to process images of different sizes. Next, the high-contrast region determination module 2603 defines a high-contrast region as $$\text{High Contrast Region} = \{(x,y) | [G_{max}(x,y) - G_{min}(x,y)] > D_0\}$$

where $D_0$ is a predetermined threshold. The value of $D_0$ is determined empirically. In the illustrated example, $D_0=140$, but it should be appreciated, however, that other embodiments of the invention may employ different threshold values depending, e.g., upon the contrast quality provided by the camera/pen device. FIG. 28 illustrates the high-contrast areas 2801 identified in image 2501 using the above-describe technique.

Figure 29:
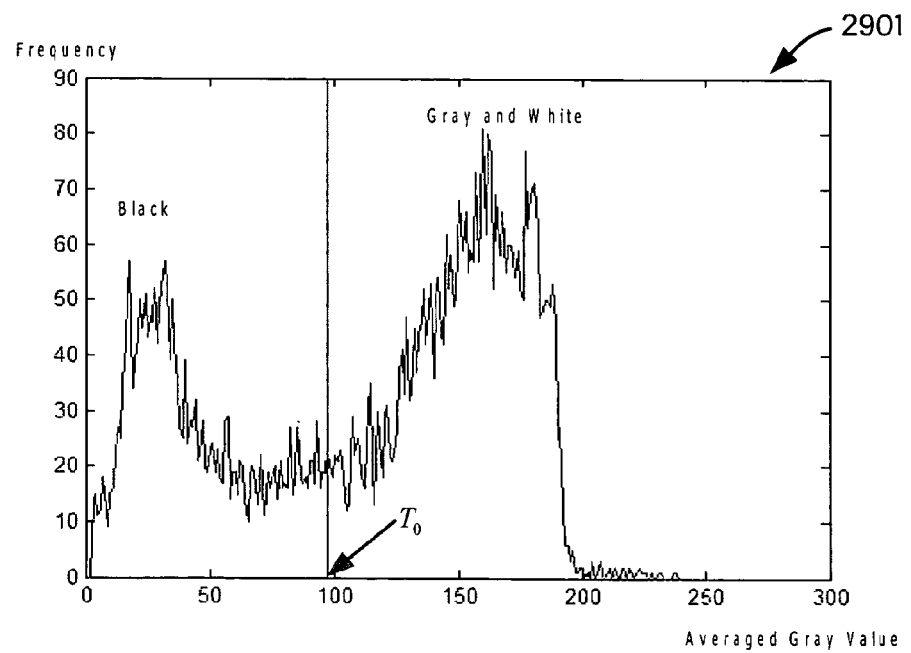
FIG. 29 illustrate an example of a gray-level histogram used to determine a content illumination threshold according to various examples of the invention.

Next, in step 2705, the content illumination threshold determination module 2605 determines a threshold for separating areas representing document content from the other areas of the image. To determine the threshold, the content illumination threshold determination module 2605 creates a gray-level histogram for the high-contrast regions. An example of such a histogram 2901 is illustrated in FIG. 29. As seen in this figure, the X-axis of this histogram 2901 corresponds to the averaged gray levels of the pixels in the high-contrast regions. The Y-axis then corresponds to the number of pixels at that gray level. From the histogram, a threshold $T_0$ for separating the darker pixels from gray and white pixels can be identified.

Any suitable technique for selecting a threshold to distinguish darker pixels from gray and white pixels may be employed. One suitable technique for obtaining the threshold $T_0$ is described, for example, in N. Otsu, "A Threshold Selection Method from Gray-Level Histogram," *IEEE Transactions on Systems, Man, and Cybernetics*, 9(1), (1979), pp. 62-66.

Once the threshold value $T_0$ has been determined, the content identification module 2607 uses the threshold $T_0$ to identify the areas of the image representing content in step 2707. First, given $T_0$, pixels in the image that are darker than $T_0$ are identified as images representing the document content and are assigned a value of 1 in a document content mask. Thus, for every pixel (x,y), if $$G_{average}(x,y) \leq T_0,$$

then Document Content Mask (x,y)=1, else Document Content Mask (x,y)=0.

After the document content mask has been created, those regions $R_t$ are identified, where t=1, 2, . . . T, of pixels $(x_i,y_i)$ as follows:

$$R_t = \{(x_i,y_i) | \text{Document Content Mask } (x_i,y_i)=1, (x_i,y_i) \text{ are neighbors}\}.$$

Figure 30:
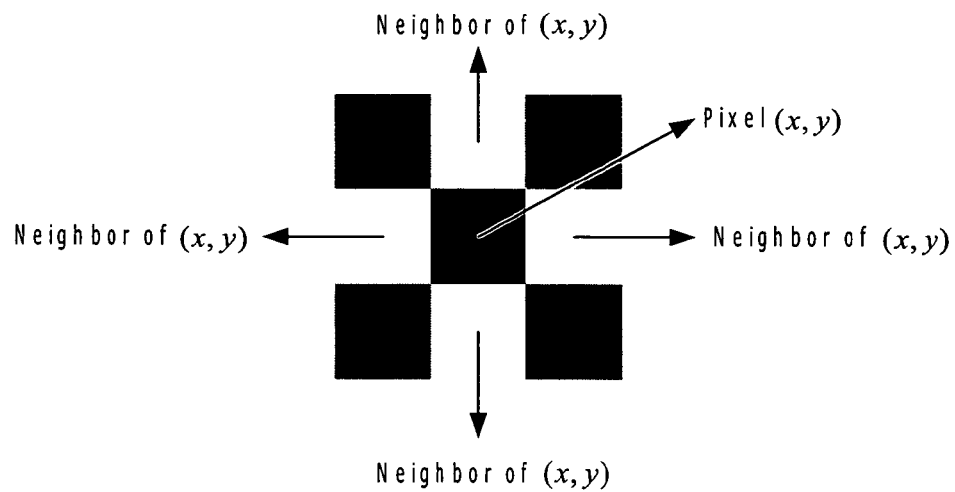
FIG. 30 illustrates a relationship between neighboring pixels.
Figure 31:
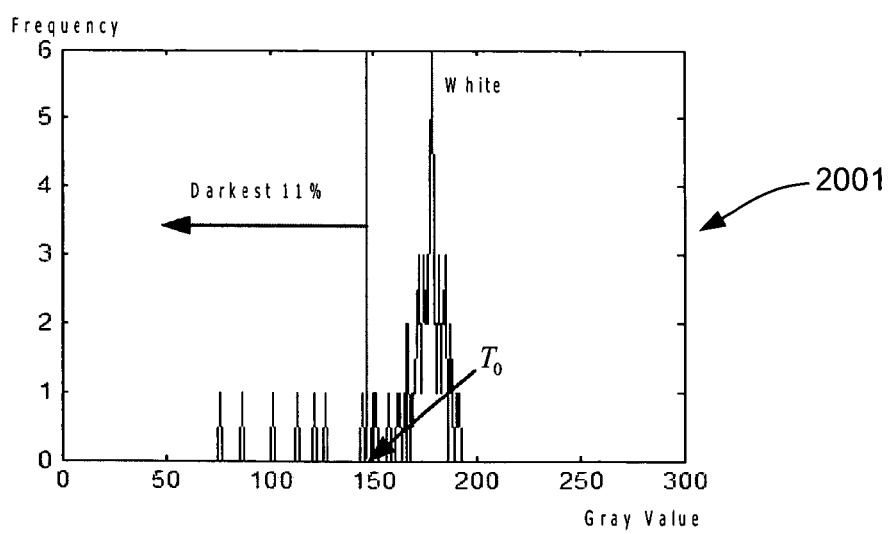
FIG. 31 illustrates an image that has been processed using the operation described in FIGS. 16A, 16B, 27A and 27B.

Two pixels are neighbors if they are directly below, above or next to each other, as shown in FIG. 30. Thus, the mask identifies regions $R_t$ of neighboring areas that represent content. In the illustrated example, if a region $R_t$ contains fewer than 20 pixels, it is removed from the document content mask. That is, for each pixel $(x_i,y_i) \in R_t$, Document Content Mask $(x_i,y_i)=0$. This eliminates regions that are too small to actually represent document content.

Next, in step 2709, the pattern illumination threshold determination module 2609 determines a second threshold for separating the areas representing the location pattern from the remaining areas of the image (i.e., the non-content areas). Initially, the pattern illumination threshold determination module 2609 segments the image into 8×8 pixel blocks. For black-and-white images, the pattern illumination threshold determination module 2609 then creates a gray-level value histogram for each 8×8 pixel block, such as the histogram 2001 in FIG. 31. As seen in this figure, the X-axis corresponds to the illumination-normalized gray levels of non-document content pixels in the block, i.e. pixels for which Document Content Mask (x,y)=0. The Y-axis then corresponds to the number of non-document content pixels at that gray level.

From the histogram, a second threshold $T_0$ is identified to distinguish location pattern areas from the remaining background areas. The second threshold $T_0$ is determined empirically, based on the size of the camera sensor in the pen/camera device and the size of a code symbol, to be approximately equal to the ratio of black dots in the code symbol. In the illustrated example, the second threshold $T_0$ is selected such that 11% of the pixels are darker than $T_0$.

Once the second threshold $T_0$ is determined, the pattern identification module 2611 identifies the areas of the image representing the location pattern in step 2711. More particularly, for every pixel (x,y) in a block, if Document Content Mask (x,y)=0 and $G(x,y) \leq T_0$, then the pattern identification module 2611 assigns Pattern Mask (x,y)=1, else, Pattern Mask (x,y)=0.

For the bottom pixels (i.e., the 4×128 pixel region along the bottom border of the image), the 4×128 pixel area directly above may be used to form 8×8 pixel blocks. Within each of these bottom blocks, the second threshold is determined using the same method described in detail above. Only those pixels in the bottom region are compared against the threshold, however, as the pixels "borrowed" from the region directly above will already have been analyzed using the second threshold established for their original blocks. Those bottom pixels that are darker than the threshold are identified as representing the location pattern.

After the pixels having a gray level below their respective second threshold values have been identified, those identified pixels that are adjacent to pixels representing document content are removed from the location pattern mask. That is, for each pixel (x,y), if Pattern Mask (x,y)=1 and a pixel among 8 neighbors of (x,y) has been identified as representing document content (i.e., there exists i, j, where i=−1, 0, 1, j=−1, 0, 1, such that Document Content Mask (x+i,y+j)=1), then Pattern Mask (x,y)=0. In this manner, the pixels making up the location pattern can be accurately distinguished from the other pixels in the image. Further, a new image can be generated that clearly distinguishes a location pattern from the remainder of the image.

Figure 35:
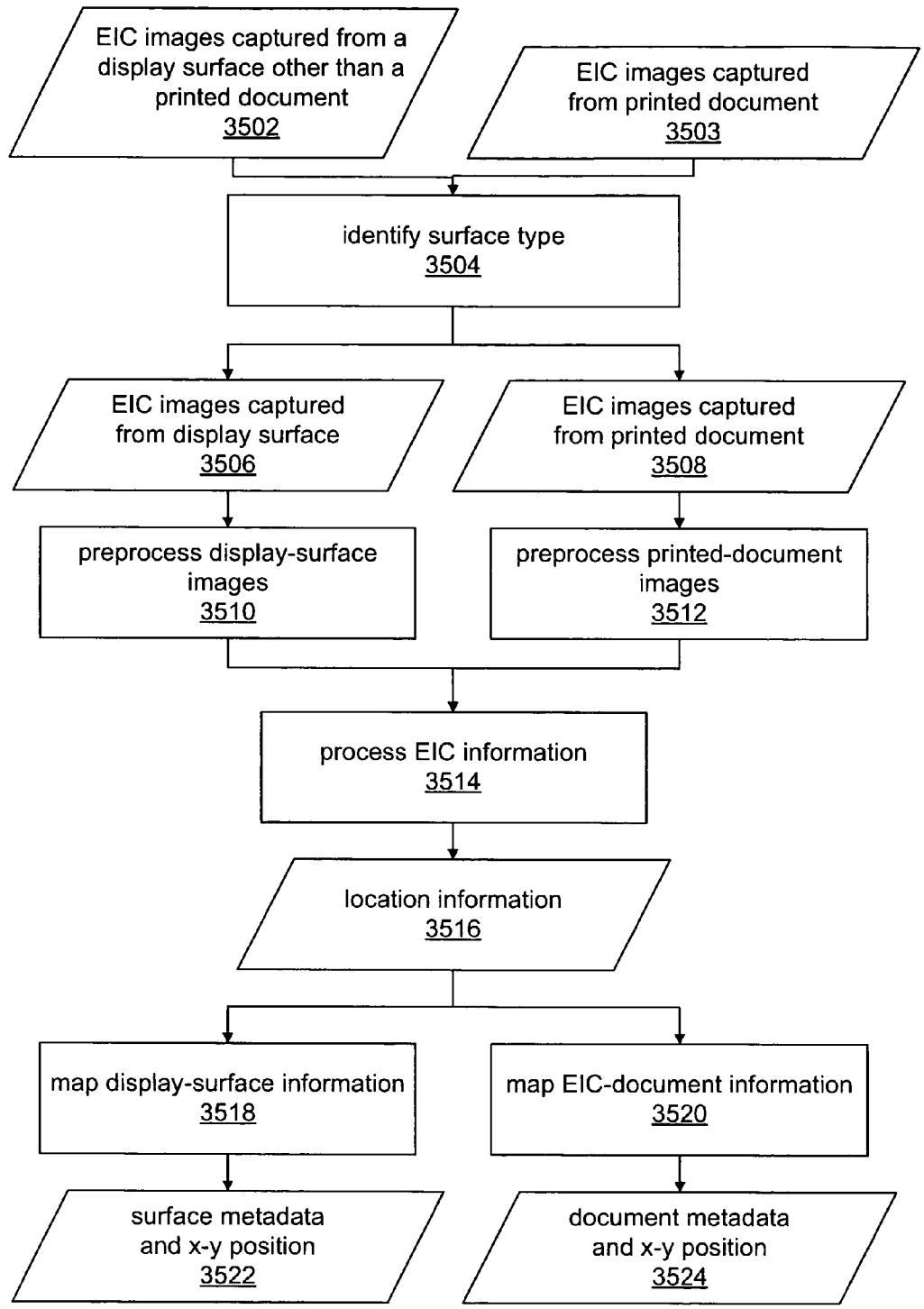
FIG. 35 shows steps, in accordance with embodiments of the invention, for processing EIC images captured from printed documents and EIC images captured from display surfaces other than a printed document.

FIG. 35 shows steps, in accordance with embodiments of the invention, for processing EIC images captured from printed documents and EIC images captured from display surfaces other than a printed document. An identify-surface-type step 3504 takes as input one or more EIC images captured from printed documents 3503 and one or more EIC images captured from a display surface other than a printed document 3502. The identify-surface-type step 3504 identifies the type of surface (i.e., printed document versus a display surface other than a printed document) from which a particular image was captured. Although EIC images captured from a display surface other than a printed document 3502 and EIC images captured from a printed document 3503 are shown separately in FIG. 35, before being processed by the identify-surface-type step 3504, the type of surface (i.e., printed document versus other than a printed document) from which a particular image was captured is unknown. On the other hand, EIC images captured from display surface 3506 have been identified by the identify-surface-type step 3504 as having been captured from a display surface other than a printed document. Similarly, EIC images captured from a printed document 3508 have been identified by the identify-surface-type step 3504 as having been captured from a printed document. Ways in which the identify surface type 3204 step may distinguish between the different types of surfaces from which images have been captured are discussed in more detail above.

Figure 36:
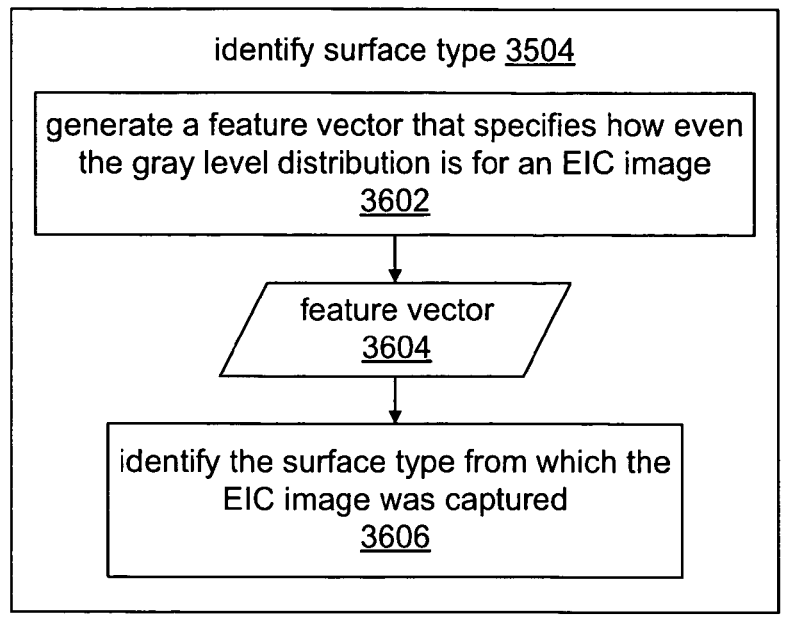
FIG. 36 shows an embodiment of the identify-surface-type step of FIG. 35.

FIG. 36 shows an embodiment of the identify-surface-type step 3504. In the embodiment of FIG. 36, a feature vector 3602 is generated at step 3602. The feature vector 3602 specifies how even the gray level distribution is for an EIC image. At step 3606, the feature vector 3602 is used for identifying the surface type from which the EIC document was captured.

Figure 37:
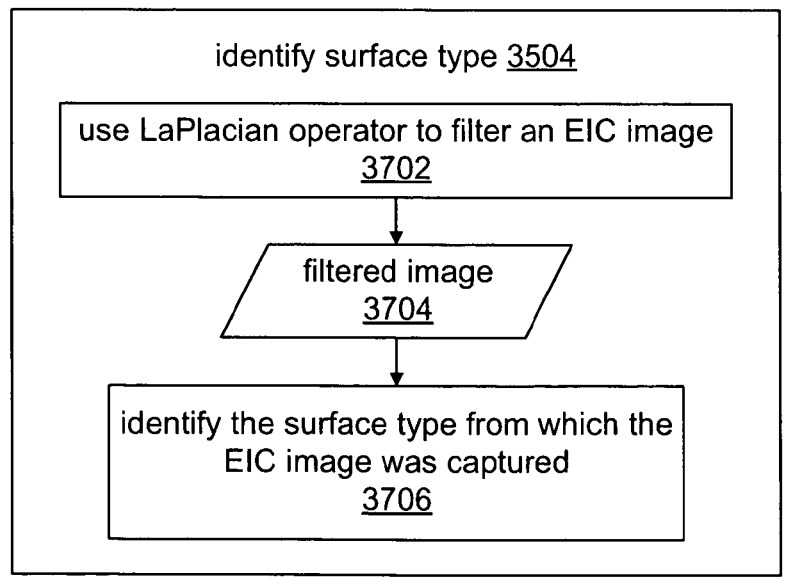
FIG. 37 shows an alternate embodiment of the identify-surface-type step of FIG. 35.

FIG. 37 shows an alternate embodiment of the identify-surface-type step 3504. In the embodiment of FIG. 37, at step 3702, a LaPlacian operator is used to filter an EIC image. The filtered image 3704 is used, at step 3706, for identifying the surface type from which the EIC document was captured.

A preprocess display-surface images step 3510 preprocesses EIC images captured from display surfaces other than printed documents (as identified by the identify-surface-type step 3504). A preprocess printed-document images step 3512 preprocesses EIC images captured from printed documents (as identified by the identify-surface-type step 3504). The preprocessing performed by the preprocess display-surface images step 3510 and the preprocess printed-document images step 3212 are similar to one another and are discussed in more detail above.

Preprocessed images are passed from the preprocess display-surface images step 3510 and from the preprocess printed-document images step 3512 to the process EIC information step 3514, which perform EIC pattern analysis, EIC symbol recognition, and EIC decoding as discussed above in more detail. Location information 3516, which is output by the process EIC information step 3514, may be input to a map display-surface-information step 3518 for images captured from a display surface other than a printed document or may be input to a map EIC document information step 3520 for images captured from a printed document.

The map display-surface-information step 3518 outputs surface metadata and x-y position 3522, and the map EIC-document information step 3520 outputs document metadata and x-y position 3524.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system having a memory and a processor that processes at least one image captured from a printed document and that processes at least one image captured from a display surface other than a printed document, the system comprising:

a surface-type-identification module that accepts as input the at least one image captured from a printed document and the at least one image captured from a display surface other than a printed document and that identifies, for a particular image, a type of surface from which the image was captured, wherein the type of surface is selected from a group consisting of: a printed document and a display surface other than a printed document, wherein the surface-type-identification module comprises a feature-based surface-type-identification module that identifies, based on a feature vector, the type of surface from which the particular image was captured and wherein the feature-based surface-type-identification module identifies the type of surface from which the particular image was captured using a linear classifier to distinguish between a feature vector of an image that was captured from a printed document and a feature vector of an image that was captured from a display surface other than a printed document;

a display-surface-preprocessing module comprising computer-executable instructions stored in the memory that, when executed by the processor, preprocesses the particular image according to a first preprocessing algorithm when the particular image is identified as having been captured from a display surface other than a printed document;

a printed-document-preprocessing module comprising computer-executable instructions stored in the memory that, when executed by the processor, preprocesses the particular image according to a second preprocessing algorithm when the particular image is identified as having been captured from a printed document; and an embedded-interaction-code-processing module that outputs location information for at least one of the at least one image captured from a printed document and the at least one image captured from a display surface other than a printed document.

2. The system of claim 1, wherein the surface-type-identification module comprises a LaPlacian-filter module that uses a LaPlacian operator to filter the particular image.

3. The system of claim 1, wherein the location information specifies an m-array location for the at least one of the at least one image captured from a printed document and the at least one image captured from a display surface other than a printed document.

4. The system of claim 1, further comprising: a surface-information-mapping module that maps the location information to surface metadata and x-y position information for the at least one image captured from a display surface other than a printed document.

5. The system of claim 1, further comprising: an embedded-interaction -code-document-mapping module that maps the location information to document metadata and x-y position information for the at least one image captured from a printed document.

6. The system of claim 1, wherein the linear classifier is a Fisher linear classifier.

7. A system having a memory and a processor that processes at least one image captured from a printed document and that processes at least one image captured from a display surface other than a printed document, the system comprising:

a surface-type-identification module that accepts as input the at least one image captured from a printed document and the at least one image captured from a display surface other than a printed document and that identifies, for a particular image, a type of surface from which the image was captured, wherein the type of surface is selected from a group consisting of: a printed document and a display surface other than a printed document;

a display-surface-preprocessing module comprising computer-executable instructions stored in the memory that, when executed by the processor, preprocesses the particular image according to a first preprocessing algorithm when the particular image is identified as having been captured from a display surface other than a printed document, wherein the first preprocessing algorithm includes reversing the particular image;

a printed-document-preprocessing module comprising computer-executable instructions stored in the memory that, when executed by the processor, preprocesses the particular image according to a second preprocessing algorithm when the particular image is identified as having been captured from a printed document; and an embedded-interaction-code-processing module that outputs location information for at least one of the at least one image captured from a printed document and the at least one image captured from a display surface other than a printed document wherein the surface-type-identification module comprises a feature-vector generation module that generates a feature vector that specifies how even a gray level distribution is for the particular image wherein generation of the feature vector by the feature-vector generation module includes calculating a horizontal projection vector and a vertical projection vector of the particular image and wherein the horizontal projection vector and the vertical projection vector are calculated as:

$$P_{horizontal}[i] = \sum_{k=0}^{w-1} I(k, i)$$

and $$P_{vertical}[j] = \sum_{k=0}^{h-1} I(j, k),$$

wherein I(x,y) is the gray level of pixel (x,y) in the particular image I and wherein w and h are the width and height, respectively, of the particular image.

8. The system of claim 7, wherein generation of the feature vector by the feature-vector generation module includes defining a horizontal peak width in the horizontal projection vector and a vertical peak width in the vertical projection vector.

9. The system of claim 8, wherein the horizontal peak width and the vertical peak width are defined as: $[v_x, v_y)]$ that satisfies the following equations:

$$\sum_{k=y_{center}-\frac{v_y}{2}}^{y_{center}+\frac{v_y}{2}} P_{horizontal}[k] = \mu S,$$

-continued $$\sum_{k=x_{center}-\frac{v_x}{2}}^{x_{center}+\frac{v_x}{2}} P_{vertical}[k] = \mu S,$$

where $$S = \sum_{i=0}^{h-1} \sum_{j=0}^{w-1} I(i, j)$$

is a gray level summation of the particular image, μ is a constant value, $x_{center}$ and $y_{center}$ are the center of the vertical and horizontal projection vector, which are defined as:

$$x_{center} = \frac{\sum_{i=0}^{w-1} iP_{vertical}(i)}{\sum_{i=0}^{w-1} P_{vertical}(i)}, \quad y_{center} = \frac{\sum_{i=0}^{w-1} iP_{horizontal}(i)}{\sum_{i=0}^{w-1} P_{horizontal}(i)}.$$

10. A system having a memory and a processor that processes at least one image captured from a printed document and that processes at least one image captured from a display surface other than a printed document, the system comprising:

a surface-type-identification module that accepts as input the at least one image captured from a printed document and the at least one image captured from a display surface other than a printed document and that identifies, for a particular image, a type of surface from which the image was captured, wherein the type of surface is selected from a group consisting of: a printed document and a display surface other than a printed document;

a display-surface-preprocessing module comprising computer-executable instructions stored in the memory that, when executed by the processor, preprocesses the particular image according to a first preprocessing algorithm when the particular image is identified as having been captured from a display surface other than a printed document, wherein the first preprocessing algorithm includes reversing the particular image;

a printed-document-preprocessing module comprising computer-executable instructions stored in the memory that, when executed by the processor, preprocesses the particular image according to a second preprocessing algorithm when the particular image is identified as having been captured from a printed document; and an embedded-interaction-code-processing module that outputs location information for at least one of the at least one image captured from a printed document and the at least one image captured from a display surface other than a printed document wherein the surface-type-identification module comprises a LaPlacian-filter-based surface-type-identification module that identifies, based on a filtered image, the type of surface from which the particular image was captured, and wherein I is the particular image and the filtered image, $I_1$, is: $I_1(x,y)=0$ if x=0 or x =w−1 or y=0 or y=h−1, otherwise, $I_1(x,y)$=−I(x−1, y−1)−I(x−1,y)−I(x−1,y+1)−I(x, y−1)+8I(x,y)−I(x,y+1)−I(x+1,y−1)−I(x+1,y)−I(x+1,y+ 1).

11. The system of claim 10, wherein the LaPlacian-filter-based surface-type-identification module identifies the type of surface from which the particular image was captured based at least in part by counting a number of positive pixels in $I_1$ and a number of negative pixels in $I_1$.

12. The system of claim 11, wherein the LaPlacian-filter-based surface-type-identification module identifies the type of surface from which the particular image was captured as a printed document when the number of positive pixels in $I_1$, is greater than the number of negative pixels in $I_1$.

13. The system of claim 11, wherein the LaPlacian-filter-based surface-type-identification module identifies the type of surface from which the particular image was captured as a display surface other than a printed document when the number of positive pixels in $I_1$, is less than the number of negative pixels in $I_1$.

14. A method performed on a computer having a memory and a processor for preprocessing an image based on the type of surface from which the image was captured, the method comprising:

receiving a captured image;

identifying a type of surface from which the image was captured, wherein the identifying includes invoking a feature-based surface-type-identification module that identifies, based on a feature vector, the type of surface from which the particular image was captured, wherein the feature-based surface-type-identification module identifies the type of surface from which the particular image was captured using a linear classifier to distinguish between a feature vector of an image that was captured from a printed document and a feature vector of an image that was captured from a display surface other than a printed document;

when the type of surface from which the image was captured is a printed document, preprocessing, by executing on a processor instructions stored in memory, the captured image according to a first preprocessing algorithm;

when the type of surface from which the image was captured is identified as a display surface other than a printed document, preprocessing, by executing on a processor instructions stored in memory, the captured image according to a second preprocessing algorithm; and outputting location information for the captured image.

15. The method of claim 14, wherein the linear classifier is a Fisher linear classifier.

16. A non-signal computer-readable storage medium storing instructions that when executed by a processor perform a method comprising:

receiving a captured image from an image-capturing pen; and identifying a type of surface from which the image was captured, wherein the type of surface is selected from a group consisting of: a printed document and a display surface other than a printed document, wherein the identifying comprises invoking a feature-based surface-type-identification module that identifies, based on a feature vector, the type of surface from which the captured image was captured using a linear classifier to distinguish between a feature vector of an image that was captured from a printed document and a feature vector of an image that was captured from a display surface other than a printed document.

17. The computer-readable storage medium of claim 16, wherein the linear classifier is a Fisher linear classifier.

* * * * *